US005248341A

United States Patent [19]

Berry, Jr. et al.

[11] Patent Number: 5,248,341
[45] Date of Patent: Sep. 28, 1993

[54] ROBOTIC CARRIER MECHANISM FOR AIRCRAFT MAINTENANCE

[75] Inventors: Henry K. Berry, Jr.; Lester L. Knight, Jr., both of Newport News, Va.

[73] Assignee: Engineering Incorporated, Hampton, Va.

[21] Appl. No.: 947,365

[22] Filed: Sep. 18, 1992

Related U.S. Application Data

[63] Continuation of Ser. No. 513,790, Apr. 24, 1990, abandoned.

[51] Int. Cl.$^5$ .............................. B25J 5/00; B05C 5/00
[52] U.S. Cl. ...................................... 118/698; 118/696;
118/712; 118/323; 239/750; 134/123; 134/181;
901/1; 901/41; 901/43; 105/163.2; 238/134;
238/135; 238/349; 238/282; 414/460
[58] Field of Search ............... 118/695, 686, 698, 704,
118/712, 323; 239/750, 752, 753; 134/172, 174,
181, 123, 45; 901/1, 43, 41, 42; 105/163.2;
238/134, 135, 171, 228, 282, 336, 349; 414/460

[56] References Cited

U.S. PATENT DOCUMENTS

| 932,464 | 8/1909 | Grant | 238/135 |
|---|---|---|---|
| 1,122,397 | 12/1914 | Jackson | 238/135 |
| 1,279,728 | 9/1918 | Liebmann | 238/282 |
| 1,352,881 | 9/1920 | DeVaughn | 238/135 |
| 2,955,546 | 10/1960 | Liebherr et al. | |
| 3,093,091 | 6/1963 | Tax et al. | 105/163.2 |
| 3,352,254 | 11/1967 | Lauber | |
| 3,460,177 | 8/1969 | Rhinehart et al. | 15/21 |
| 3,601,832 | 8/1971 | Cook | 15/21 |
| 3,711,055 | 1/1973 | Schultz et al. | |
| 3,774,547 | 11/1973 | Widiger et al. | 238/134 |
| 3,835,498 | 9/1974 | Arato | 134/57 R |
| 3,875,868 | 4/1975 | Martin, Jr. | |
| 4,000,702 | 1/1977 | Mackintosh | |
| 4,171,774 | 10/1979 | Deslauriers | 238/171 |
| 4,301,740 | 11/1981 | McGinness | |
| 4,378,755 | 4/1983 | Magnusson et al. | 118/684 |
| 4,669,390 | 6/1987 | Bisiach | 901/1 |
| 4,702,661 | 10/1987 | Bisiach | 901/1 |
| 4,785,994 | 11/1988 | Crone et al. | 238/171 |

FOREIGN PATENT DOCUMENTS

| 0043208 | 1/1982 | European Pat. Off. | |
| 0168850 | 1/1986 | European Pat. Off. | |
| 0341134 | 11/1989 | European Pat. Off. | |
| 389327 | 9/1990 | European Pat. Off. | 901/43 |
| 3623350 | 4/1988 | Fed. Rep. of Germany | 901/1 |
| 231932 | 1/1986 | German Democratic Rep. | 901/1 |
| 238566 | 8/1986 | German Democratic Rep. | 901/1 |
| 1-257581 | 10/1989 | Japan | 901/1 |
| 906906 | 2/1982 | U.S.S.R. | 105/163.2 |

Primary Examiner—Peter Chin
Assistant Examiner—Todd J. Burns
Attorney, Agent, or Firm—Lalos & Keegan

[57] ABSTRACT

Disclosed is a robotic paint system for aircraft consisting of a robotic wash/rinse gantry, a robotic cart carrying a robotic painting system, and a control system.

The paint system includes a robotically controlled wash/rinse gantry movable along the entire extent of the aircraft being maintained. A robotically controlled cart is provided which is carried by a plurality of wheel assemblies on a curved track. A robotically controlled platform is provided for carrying the robotic painting system, and a mechanism is also provided for adjusting the platform up and down as well as towards and away from the platform.

27 Claims, 29 Drawing Sheets

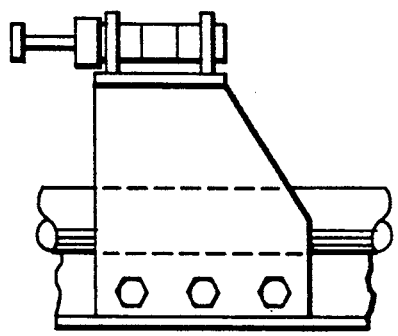
*FIG. 2A*
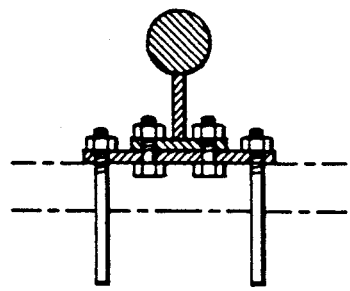
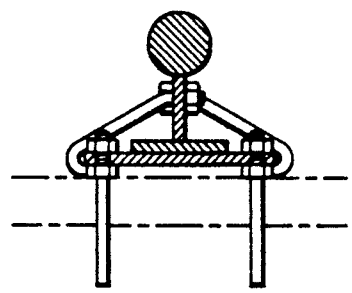
*FIG. 2B*  *FIG. 2D*
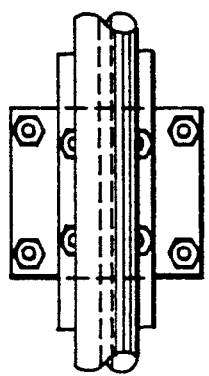
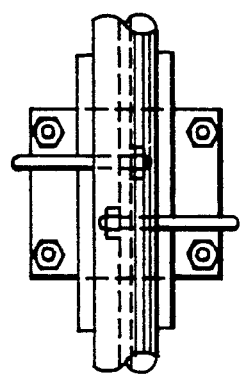
*FIG. 2C*  *FIG. 2E*

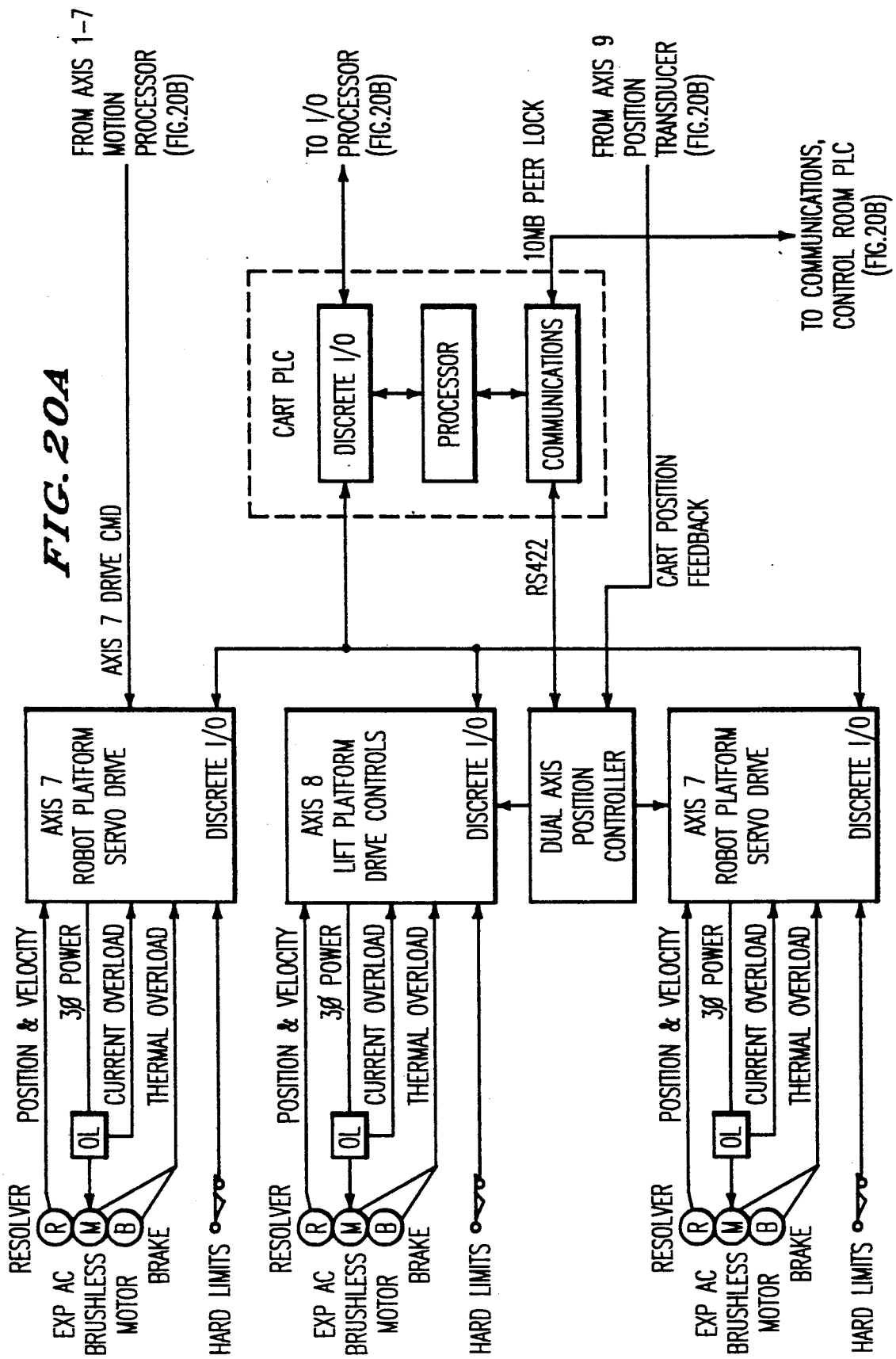

ROBOTIC CARRIER MECHANISM FOR AIRCRAFT MAINTENANCE

This is a continuation of copending application Ser. No. 07/513,790 filed on Apr. 24, 1990 now abandoned.

BACKGROUND OF THE INVENTION

1. Field of the Invention

Substantial progress has been made in the development of automated painting systems in recent years, particularly in the application of robots for assembly lines for automotive and other industrial purposes. Although driven by the need for reduced painting costs per item, these robotic-based painting systems also provide increased versatility in paint applications as well as increased safety of personnel by removing them from the paint booth.

2. Discussion of the Background

In the automotive field, car and truck bodies are carried by conveyor means to the situs of the paint system robot. This is practical for relatively small items such as automobile bodies, but is not practical for much larger bodies such as airplanes.

SUMMARY OF THE INVENTION

Accordingly, it is an object of the present invention to provide an apparatus capable of automated painting of items such as airplanes.

It is a further object of this invention to provide a robotic carrier mechanism capable of repeatedly replicating its position relative to an aircraft so that programmed operations can be carried out on a number of aircraft without the necessity of reprogramming the controls each time another aircraft is positioned for maintenance.

The assembly line operation is a natural environment for the lead-through programmed robot because of its fixed or indexed base. However, these robots can be adapted to fixed reference frame of a movable base. Thus, to a modify the robotic painting system from the high volume automotive type assembly line to the low volume aircraft finish line, it is necessary to provide a versatile service vehicle which carries the complete paint system and positions the robot repetitively for lead-through programming of paint applications.

The key, then, to the development of the aircraft painting system is the development of a versatile service vehicle. Once obtained, this service vehicle is fitted with a proven painting robot and the associated paint mixing and supply system. The painting system of this invention is complete—it includes all elements of the integrated vehicle/paint application system.

Although the approach is generally applicable to aircraft of any size, the preferred embodiment will be geometrically configured for aircraft with a wing span and length up to 75 feet, focusing on servicing attack or fighter aircraft such as the F-15.

The proposes proposed system involves the integration of an existing painting subsystem (robot, guns, mixing systems, tanks, etc.) and a service vehicle which supports and positions the robot around as necessary for painting.

This is achieved by the integration of an existing painting subsystem with a service vehicle designed to incorporate needed features of high mobility and precise control over position and orientation. Although options exist for battery powered systems and for wireless control through telemetry, IR, ultrasonic and other signal means, the payoffs of high reliability through the use of proven techniques in an unknown environment and the cost effectiveness of using simple, proven hardware led to the selection of hardwired systems for both power and control systems.

The robotic painting system is capable of painting F-111, F-15, F-106, F-4, and A-10 aircraft. Only one operator will be required and he will be located in an environmentally protected control room.

This invention consists of four elements—the robotic painting subsystem, the mobile positioning platform, the wash and rinse gantry, and the control system. These are discussed in greater detail below.

The robotic painting subsystem includes all features and components that would be used if the robot were set up to paint components in an assembly line environment. It involves all components for mixing, metering, and spraying paint as preprogrammed by lead-through or paint-to-paint programming techniques.

The mobile positioning platform is the base for the robotic painting and preparation subsystems. Its purpose is to provide a highly stable mobile structure to which the painting robot is mounted and to carry all supplies required to furnish the robot with paint for assigned tasks. When the robotic painting subsystem requires resupply, maintenance, and/or any other service, the mobile positioning platform vehicle may be driven to the resupply and maintenance area either by remote control, or manually.

The mobile positioning platform will also position the robot so it can repetitively apply paint in the preprogrammed fashion. To paint a given aircraft, this involves positioning the robot at several predetermined floor locations. Selected positions will vary according to the aircraft configurations.

The proposed system will combine electromechanical technology for extending and positioning a mobile base on which will be mounted a widely used state-of-the-art painting robot. The base extends the reach of the robot relative to the vehicle, laterally 14 feet and vertically from 3 feet to 20 feet. Combined with the unique rail steering feature, this provides the capability to reach any location on the inventory of fighter or attack aircraft.

The mobile positioning platform will be fitted with a non-intrusive, anti-collision system which will depower the service vehicle at a prescribed position relative to the aircraft. From the depowered position, the computer can switch the drive system to an inching mode so it can be slowly moved backward a safe distance before the drive system is again fully integrated.

The wash and rinse gantry is separate from the mobile positioning platform and consists of a moveable frame-work wider than the wing-span of the aircraft. The gantry includes two banks of piping—a low pressure system for rinse cycles and a high pressure system for Wash cycles. The gantry is maintained in a proper orientation relative to the aircraft with tracks and ultrasonic distance measuring devices on both sides of the gantry.

The control system will be initiated with a key lock from the mobile positioning platform which disables all manual pendants and activates control room operations. From this point, automatic spraying commences by operator commands from the graphical display terminal menu. The system is capable of accessing up to a minimum of 1MM programmable addresses with a six digit address. All operator communication with this system will be via a CRT and tactile key board. Serial ports are used for uploading/downloading from a host computer. The RS-232 serial link to the robotic paint system digital control console initiates functions to the I/0 interface such as power up, paint mix criteria, and monitors system interlocks such as pressure, temperature, level, paint capacity, and other critical parameters. The robot will be provided with a teaching pendant. This pendant is intrinsically safe and mounts inside the control room. It provides control over the robotic paint system for the following functions: pump (ON/OFF); Automatic (ON/OFF); I/0 (ON/OFF); program halt/continue; teach/repeat; edit/correct; output forcing program swap; program selection (with six digit "LCD" display); and stop. Communication to the main control panel is via RS-232.

These input/output signals are optically isolated at the control room and hardwired to the appropriate system through the multi-pan overhead cable arrangement. Heavy duty rolling hose carriers will be provided for all air, electrical, and paint services to the robot manipulator and axes. These carriers provide an excellent means of protection as well as a neat and orderly system for handling service lines.

The entire system is located in a building with the mobile platform and gantry within a climate controlled paint booth and a control booth in close, visual proximity of the booth. Elements used with the paint are explosion proof.

Further features of the invention will be apparent from a consideration of the detailed description of a preferred embodiment of this invention and a considerations of the accompanying drawings.

It should be noted that although the discussion above has been directed to a wash/rinse-painting system, the system may also be employed in other fields such as aircraft maintenance, welding, riveting, inspection, measurement of structural distortion, and the like. It could also be employed with other large items such as ships, submarines, and the like.

A more complete appreciation of the invention and many of the attendant advantages thereof will be readily obtained as the same becomes better understood by reference to the following detailed description when considered in connection with the accompanying drawings, wherein:

BRIEF DESCRIPTION OF THE DRAWINGS

FIG. 2A is a side view of a shock absorber employed at both ends of the inner horseshoe track.

FIGS. 2B and 2C are detail views of the track where it is rigidly fixed to the ground at one location at the apex of the horseshoe track.

FIGS. 2D and 2E are detail representative views of a plurality of tie-down locations along the length of the horseshoe track where the track is slidable relative to the base to accommodate expansion and the like.

FIGS. 20 and 20a-20d are block diagrams of the controls for the invention.

DESCRIPTION OF THE PREFERRED EMBODIMENT

Figure 1:
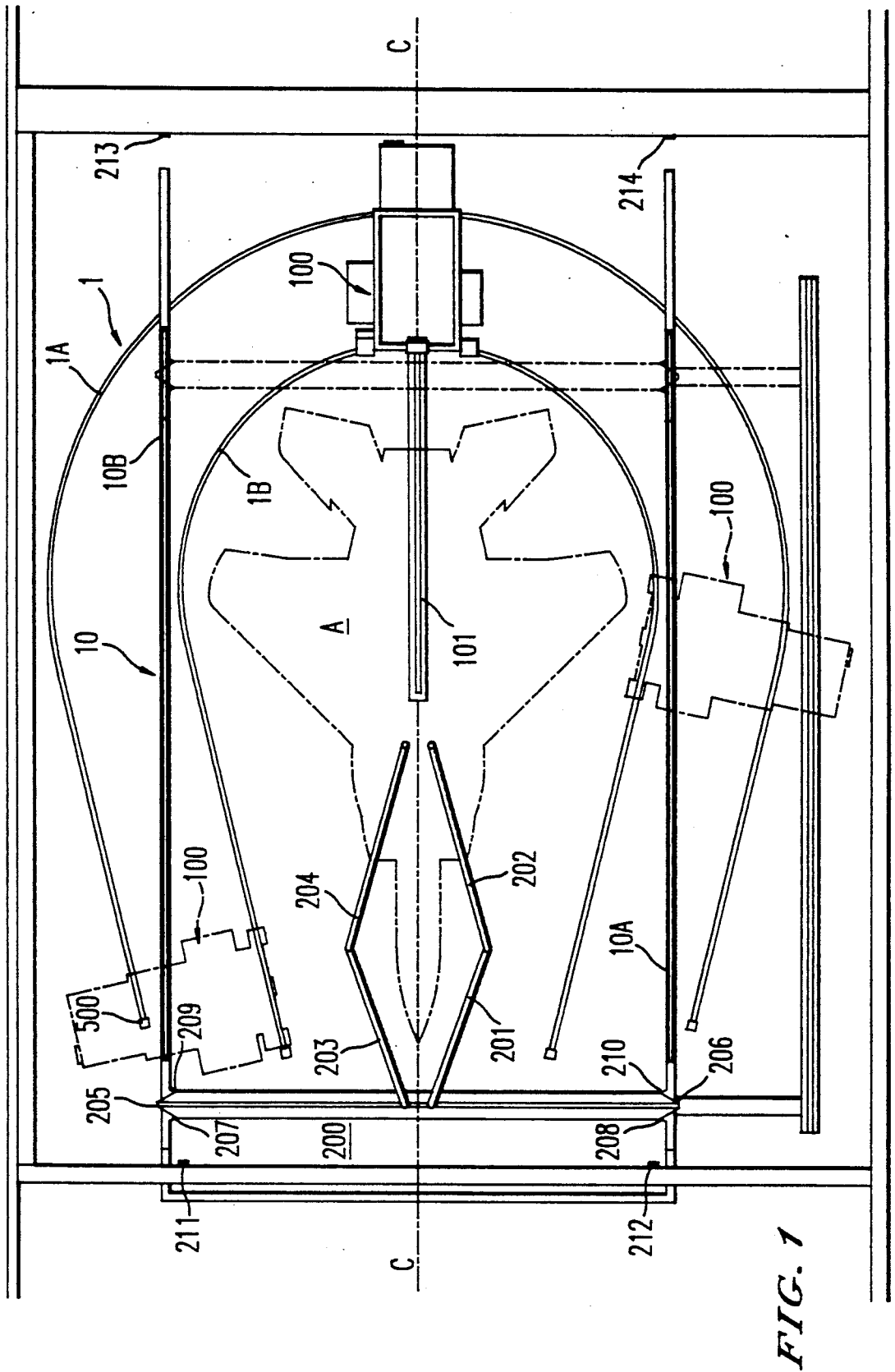
FIG. 1 is a top view of the system, with an airplane shown in phantom lines.

An overall top view of the major components of this invention is found in FIG. 1. A fighter aircraft A is shown in phantom lines. Surrounding plane A is a double horseshoe track 1 including outer track 1A and inner track 1B. The painting robot cart 100 is moveable on track 1, and is illustrated in its "home position" at the apex of horseshoe track 1. The cart is shown in two other positions in phantom lines. Festoon 101 carries power, pressure lines and the like from a fixed point on the ceiling of the building housing the system to a point on the cart as will be explained below in greater detail. All festoon components are explosion proof.

Another set of tracks 10, consisting of a port side track 10A and a starboard side track 10B which are parallel to each other, carry the wash/rinse gantry 200.

Horseshoe-shaped track 1 and parallel track 10 are of a size as to completely encompass airplane A so that cart 100 can be moved from the starboard side of the nose of the plane back around the tail of the plane and forward to the Port side of the nose of the plane—and any point in between. The gantry 200 is in a "home position" in front of the nose of the plane and can be moved along track 10 to a point past the tail of the plane.

Gantry 200 is in fluid communication with two outlets in the ceiling by means of articulated high pressure pipe segments 201 and 202 and articulated low pressure pipe segments 203 and 204. High pressure pipes 201 and 202 are connected to each other by two swivel joints, with segment 201 attached to the gantry by a third swivel joint and segment 202 attached to the ceiling by a fourth swivel joint. Low pressure pipes 203 and 204 are similarly connected. The high pressure pipes carry wash fluid and the low pressure pipes carry rinse fluid. The swivel joints allow the pipes to adjust as the gantry is moved on its track from one end of the plane to the other.

Ultrasonic distance sensors are positioned on the gantry to ensure that the gantry wheels track in synchronization with each other. The gantry 200 is carried on track 10 with two wheel assemblies - a master wheel 205, and a slave wheel 206. The master wheel is driven by the controller relative to the plane's position, and the slave wheel movement is synchronized to the movement of the master wheel. There are four ultrasonic sensors 207, 208, 209 and 210 carried on the gantry with corresponding targets 211, 212, 213 and 214 mounted on the wall or floor of the building. The targets 211, 212, 213 and 214 are mounted on the wall or floor of the building. The sensors, which are conventional and are of the type used on cameras, are accurate to 0.01% over approximately a 50 foot range, i.e., about 1/16" over a fifty foot range. Thus, sensors 207 and 208 and targets 211 and 212 are used when the gantry is in the region of the front part of the plane, and sensors 209 and 210 and targets 213 and 214 are used when the gantry is in the region of the back part of the plane.

Figure 2:
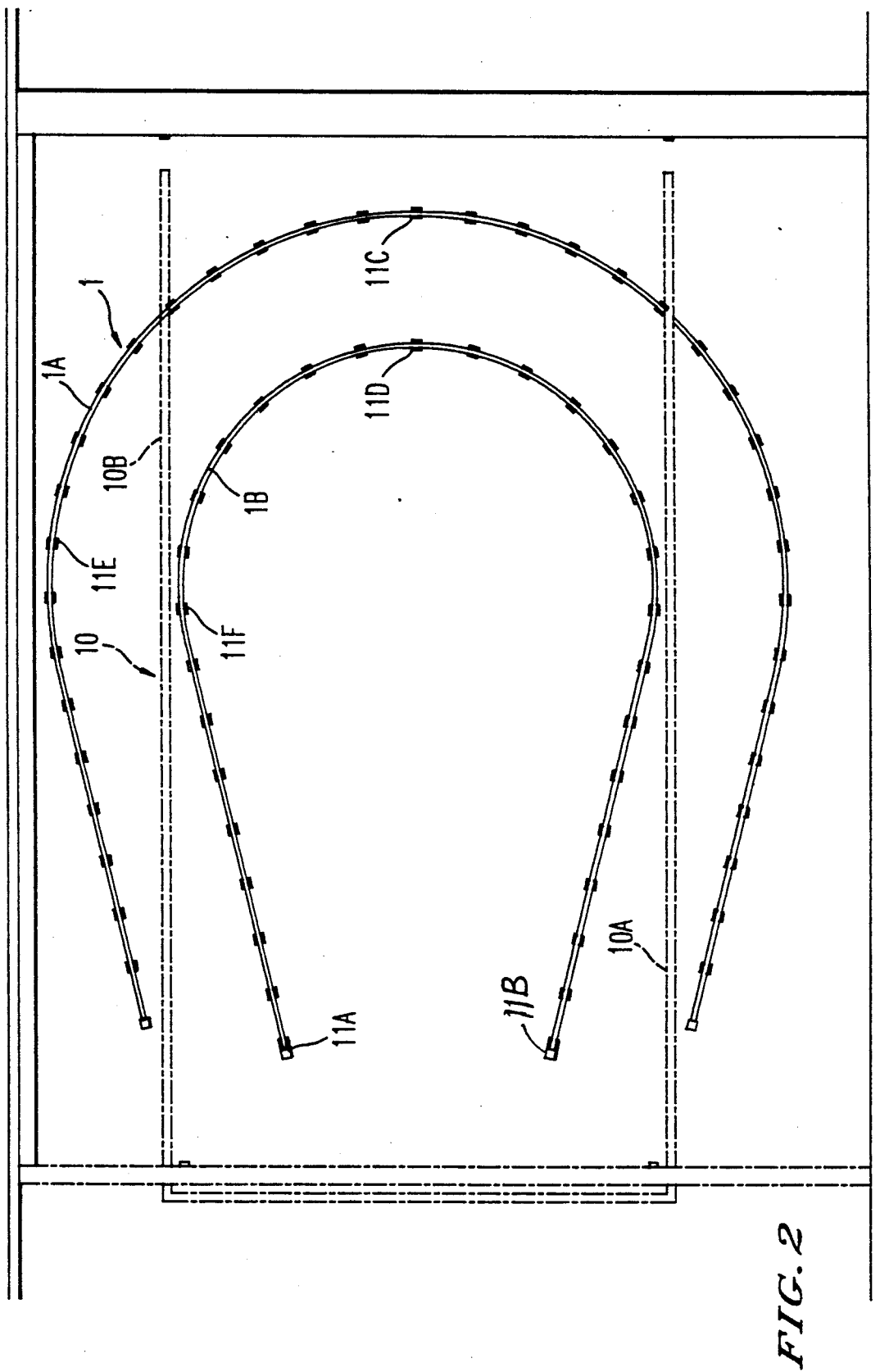
FIG. 2 is a top view of the horseshoe-shaped track employed by the mobile platform.

Referring to FIG. 2, two shock absorbers 11A and 11B are positioned at the two ends of track 1B. A shock absorber is illustrated in FIG. 2A and is rigidly mounted on the track. At points 11C and 11D, the tracks are rigidly attached to the floor of the building, as illustrated in FIGS. 2B and 2C. At all other track tie down locations (for example, points 11E and 11F), the tracks are slideably attached to the floor to allow the track to move slightly to compensate for thermal expansion and the like. These slidable connections are illustrated in FIGS. 2D and 2E.

Figure 3:
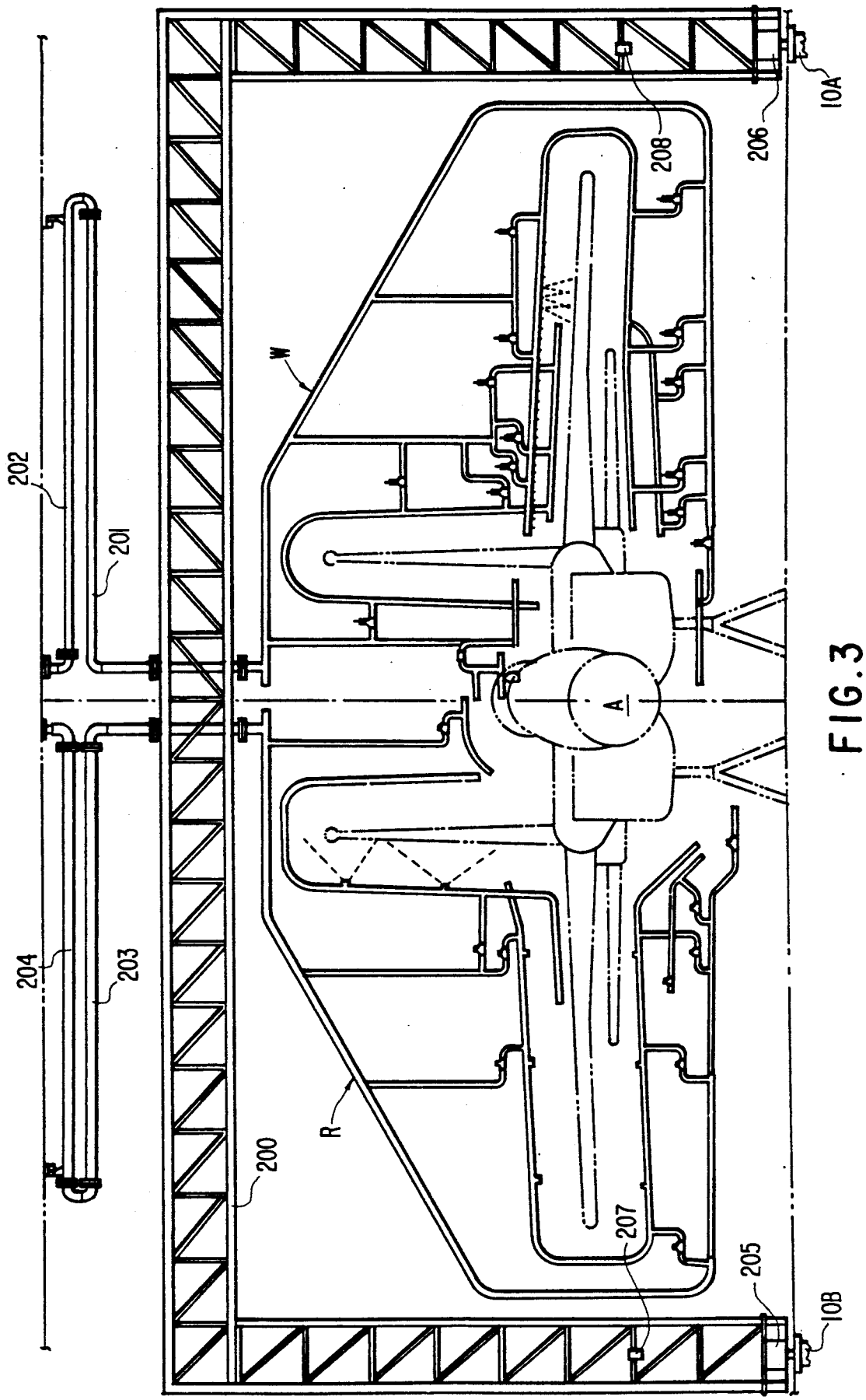
FIG. 3 is an elevational view of the wash/rinse gantry with an airplane shown in phantom lines wherein the left side shows rinse piping and the right side shows wash piping.

An elevational view of the gantry is seen in FIG. 3. The gantry has two separate piping systems—one for wash-W and one for rinse-R. FIG. 3 shows half of the wash bank on the right and half the rinse bank on the left. These two banks are illustrated in greater detail in FIGS. 4 and 5.

Figure 4:
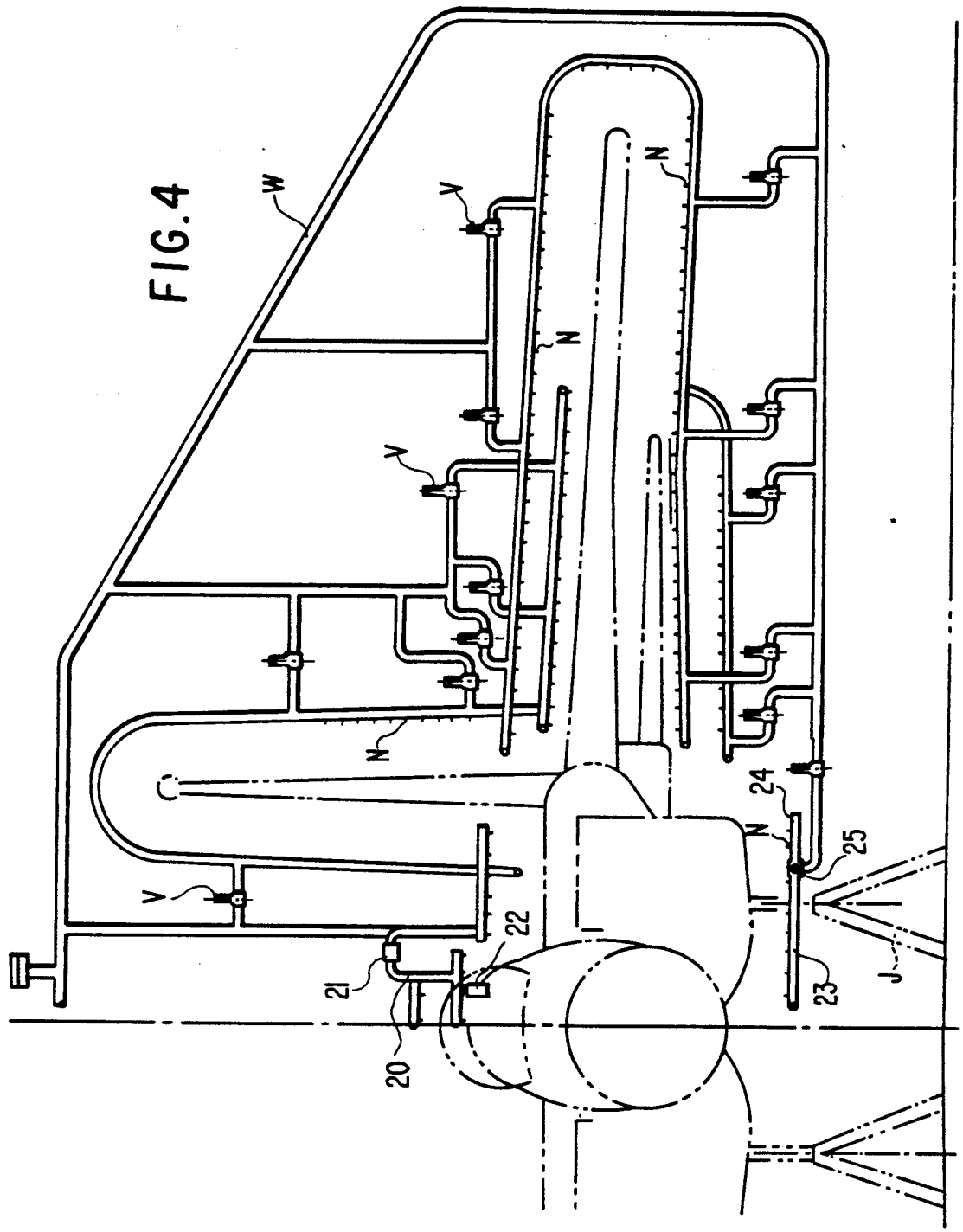
FIG. 4 is an enlarged elevation view of one side of the gantry showing wash piping.

High pressure wash piping is illustrated in FIG. 4. A plurality of remotely controlled valves V control the flow of high pressure washing fluid to selected portions of the plane. Prohibitively large pumps and horsepower requirements would be necessary if the entire surface of the plane was to be washed at once with high pressure fluid. It has been found to be more desirable to open only one (or a few) valves at one time so that a lesser amount of wash fluid can be directed only to a portion of the plane surface. The gantry can make multiple passes —over the length of the plane, opening and closing various valves so that all surfaces are washed one representative segment of pipe controlled by one valve is shown in FIG. 4. At two locations, the wash pipe is moveable to accommodate the plane. Segment 20 of the wash pipe is moveable through swivel 21 as roller 22 passes over the surface of the canopy of the plane. Segment 23-24 of the wash pipe is L-shaped and pivots at joint 25 so that it can pivot around jack J holding up the plane.

Figure 5:
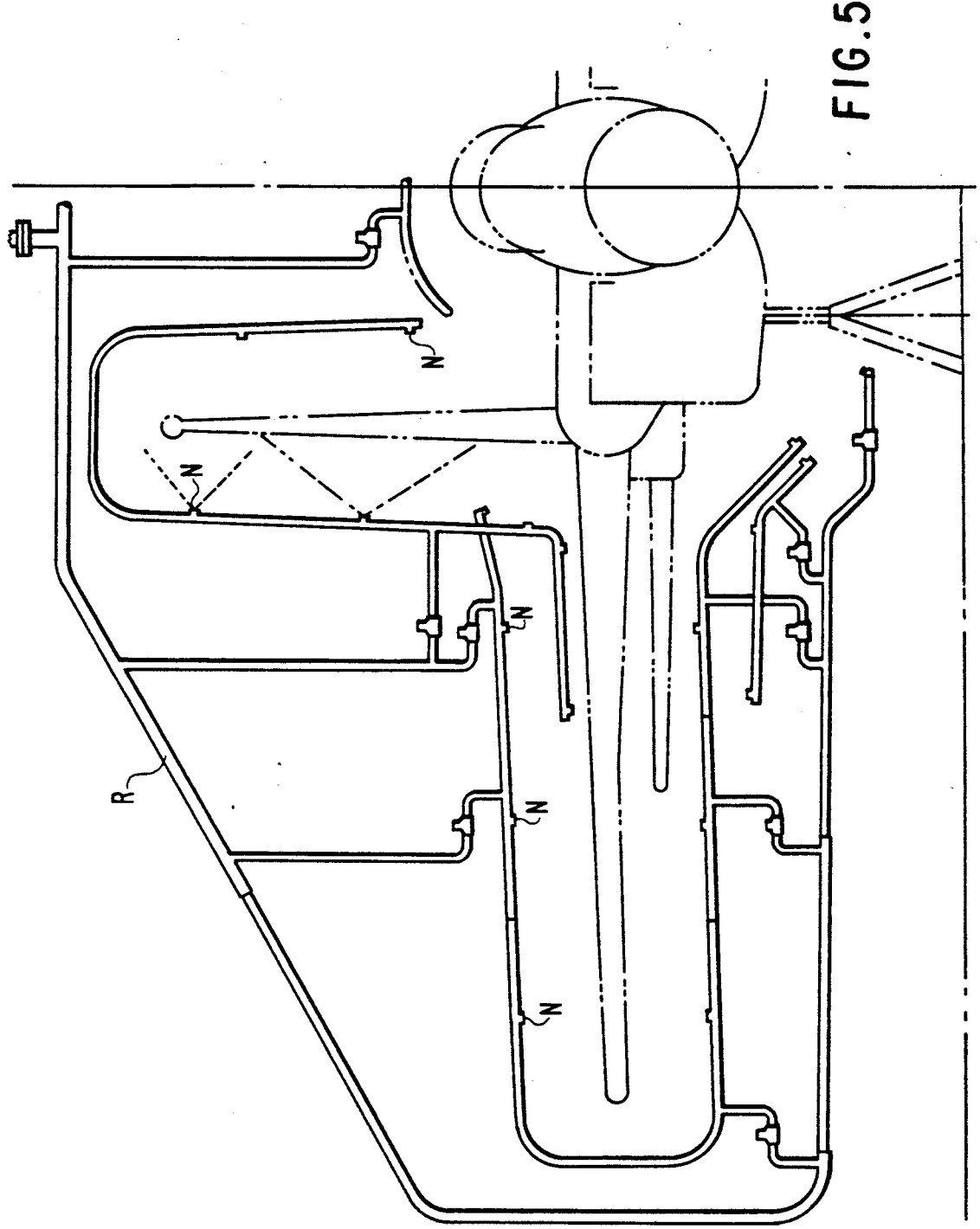
FIG. 5 is an enlarged elevation view of one side of the gantry showing rinse piping.

FIG. 5 shows the rinse pipe system R. Fewer valves are needed since the rinse fluid is low pressure.

Both wash and rinse fluid is applied to the plane through a plurality of nozzles N, either high pressure or low pressure as appropriate.

When positioning the plane relative to the gantry and cart the following steps occur. The plane is backed up until the wheels come against hard stops fixed on the floor. The longitudinal axis of the plane is positioned within plus or minus 6 inches of the center line C—C (FIG. 1) of the horseshoe track. The plane is jacked up off the wheels on a three point jacking system and the landing gear is retracted. Conventional measuring means control the height of the plane and ensure that it is level relative to the floor. Skew compensating adjustment can be controlled by means of acoustic distance measuring devices on the gantry and targets on the plane surface. Thus, even if the plane is slightly skewed, the centerline for reference purposes can be redefined for each parked airplane. Once the longitudinal axis, height, level and skew are set or read by sensors, the precise location of the plane—and all its surfaces—will be known to the controller which controls the gantry and cart. Each aircraft will have set locations for the cart to cover the entire surface of the plane. For example, for an F-15, there are eleven locations for the cart—one at the apex and five on each side. Each location has a high painting robot position and a low painting robot position, for a total of 22 painting robot positions to cover the entire surface of the plane.

Figure 6:
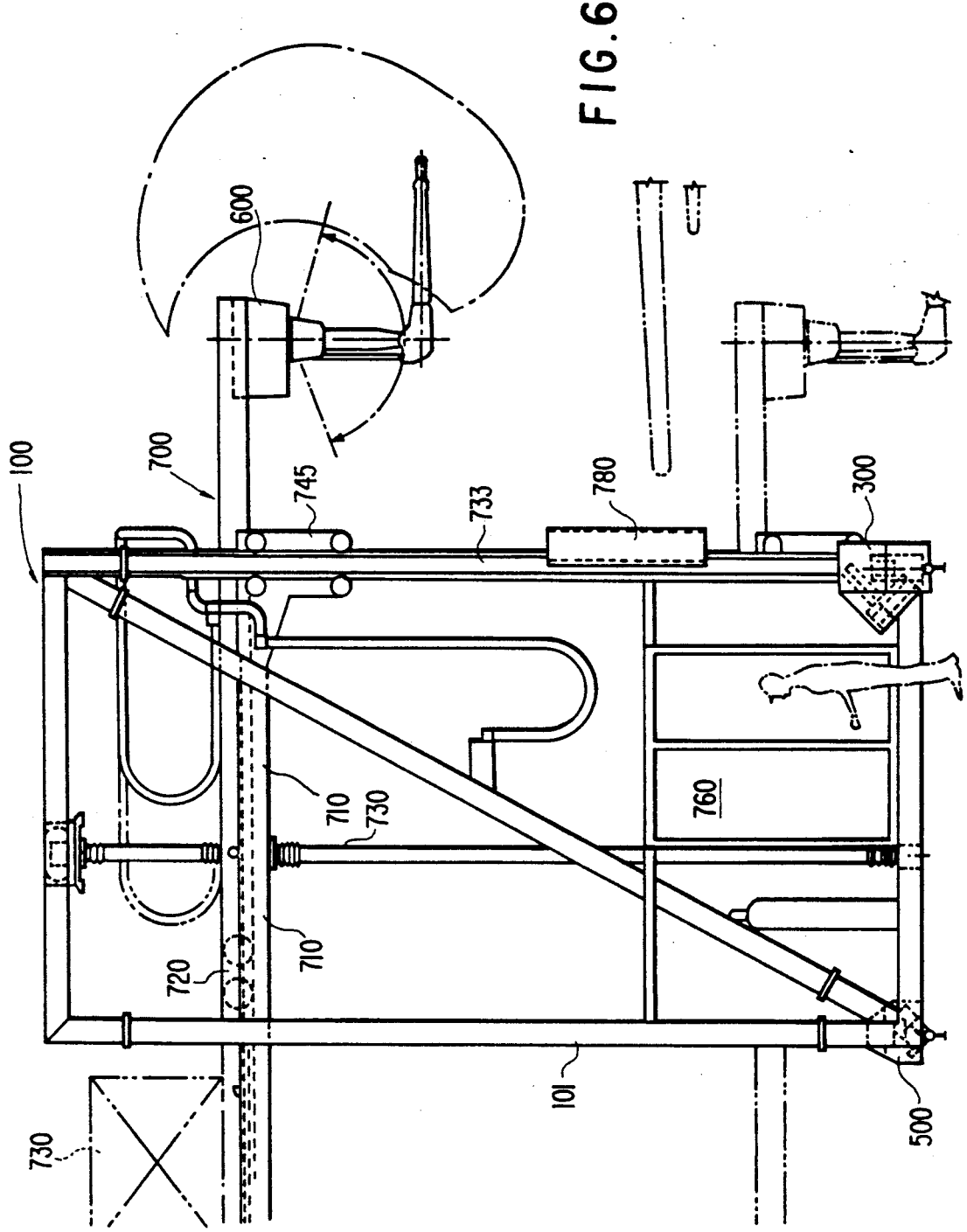
FIG. 6 is a side view of the mobile platform cart assembly.

The cart assembly 100 shown in FIG. 6 includes a large, open, box-like structural frame 101 which is carried on three weight bearing wheel assemblies adapted to follow horseshoe track 1. Driven wheel assembly 300 is shown in detail in FIGS. 14A to 14D, idler wheel assembly 400 is shown in detail in FIGS. 16A to 16D, and slip wheel assembly 500 is shown in detail in FIGS. 17A to 17D. The painting robot 600 is carried on a compound platform 700 which includes a lift platform 710 for up-down movement in the cart and a robot platform 720 for in-out (i.e., towards and away) movement relative to the cart.

Figure 7:
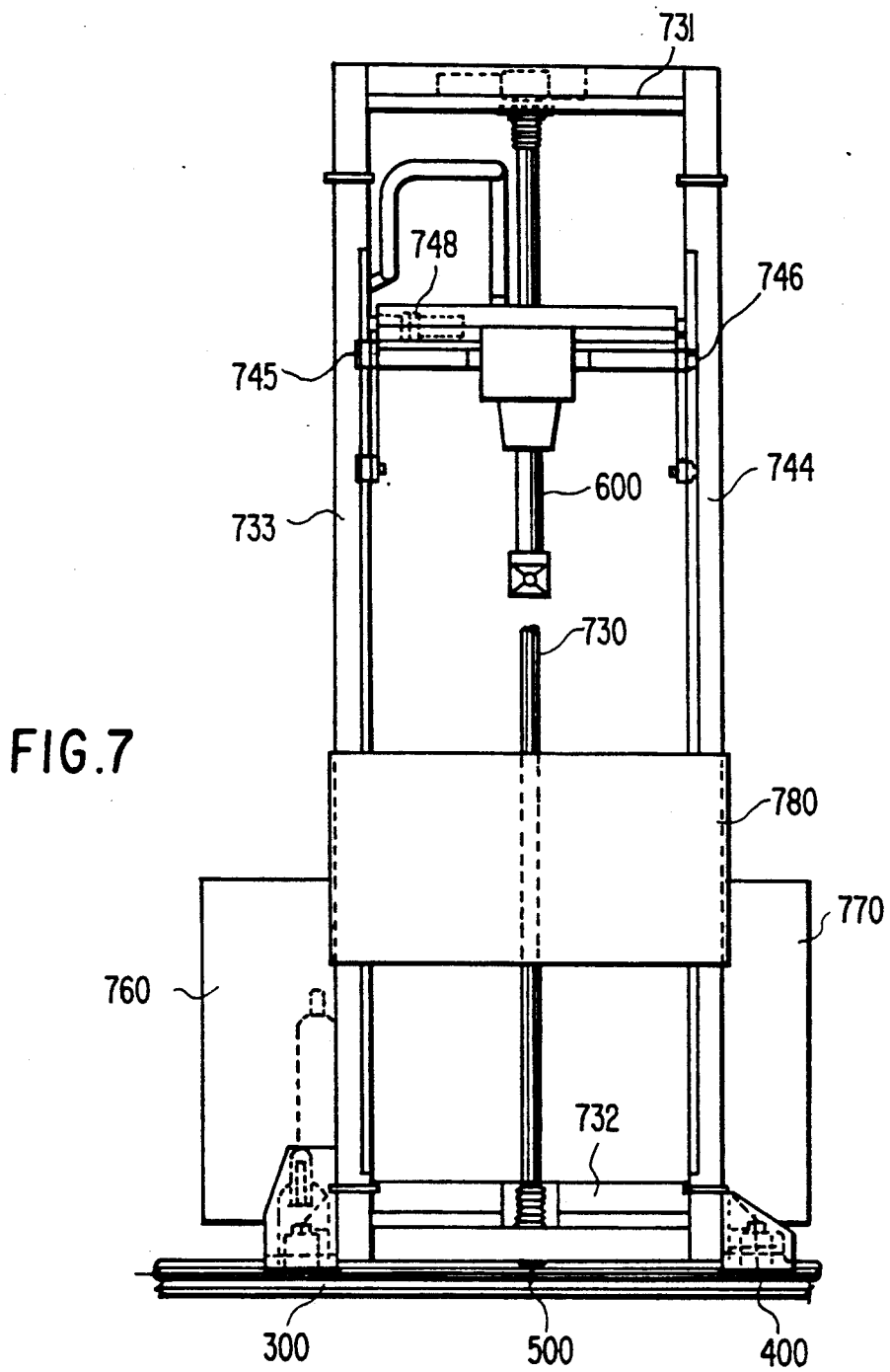
FIG. 7 is a front view of the apparatus of FIG. 6.

Tank carrier 734 is located on top of one end of the robot platform 720 and includes tanks for paints and etching fluids such as acids. These tanks are connected to the robot painter through short runs of hose or tubing, which is desirable to avoid clogging and fouling which occurs over long distances. Lift platform 710 is moved up and down relative to the cart by means of a large ball screw 730 from which platform assembly 700 is hung. The ball screw mechanism is always in tension and is supported at the upper end of the carrier on cross beam 731 and the lower end on cross beam 732 (FIG. 7). Lift platform 710 rolls up and down on vertical carrier struts 733 and 744 with V-roller assemblies 745 and 746, as the ball screw assembly 730 is turned on its axis. Robot platform 720 rests on the top of lift platform 710 and has a slot 747 therein so it can move relative to the shaft of ball screw 730. Platform 720 is constructed so that when unstressed it would slightly bend upwardly. The weight of painting robot 600 will counter this bend so that as the platform extends out from the cart, it will remain level. Robot platform 720 rides on V-rollers following rails on the lift platform 710, and is driven by a rack and pinion assembly 748. The rack is located on the lift platform and the pinion is located on the robot platform. Also operatively connected to the robot platform 720 is a motor 749, a brake 750, and a position sensing resolver 751, all of conventional design.

Figure 8:
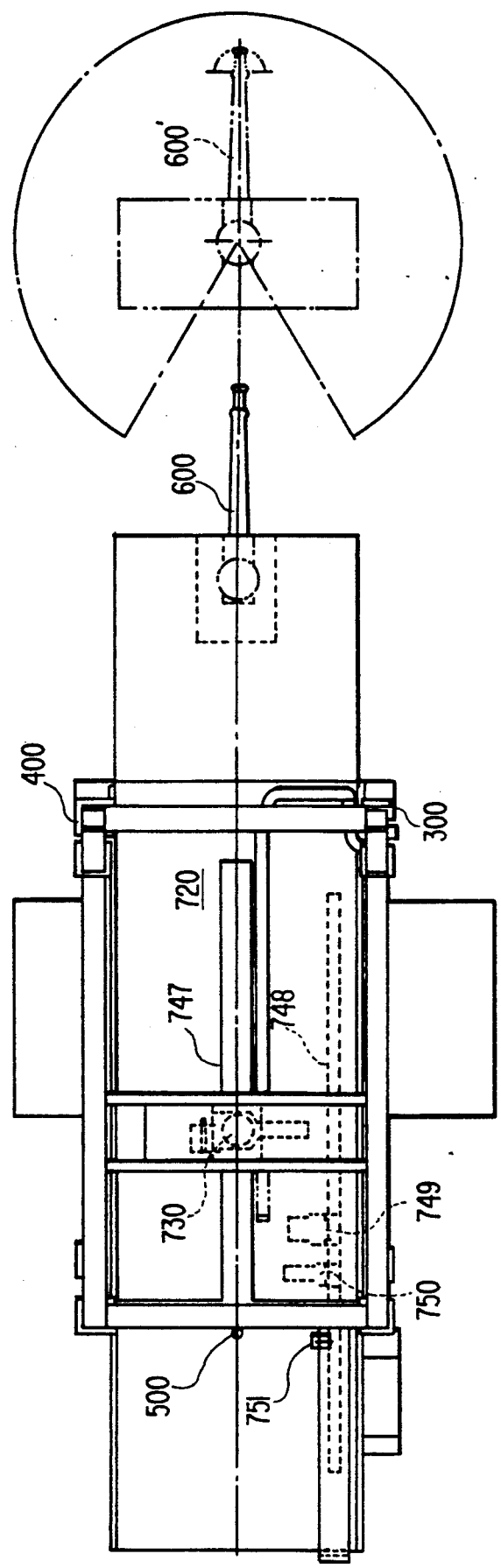
FIG. 8 is a top view of the apparatus of FIG. 6.
Figure 9:
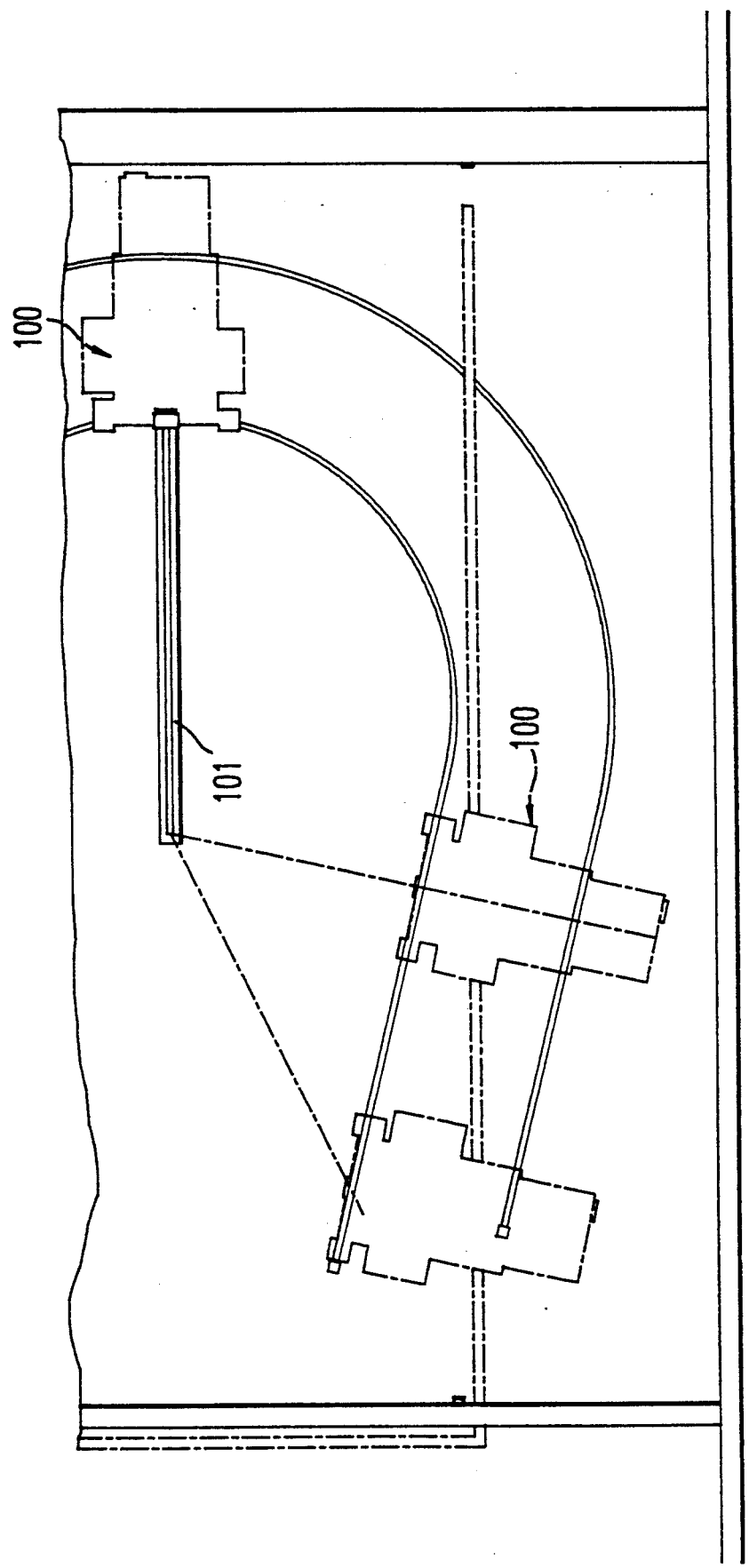
FIG. 9 is a top view of the festoon which supplies power, air pressure and the like to the cart assembly.
Figure 9E:
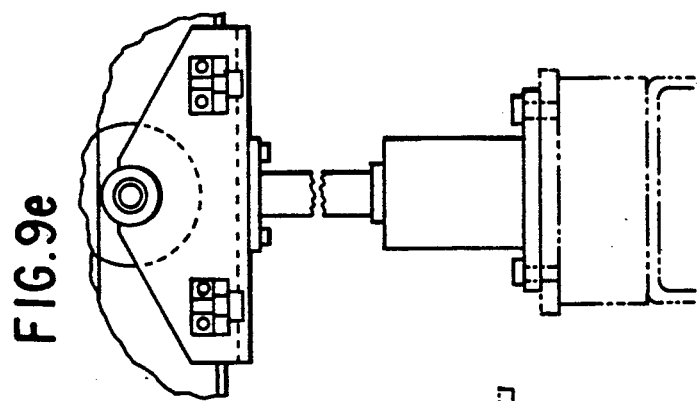
FIG. 9E is a partial view of the connection between the festoon and the cart.
Figures 9C, 9D:
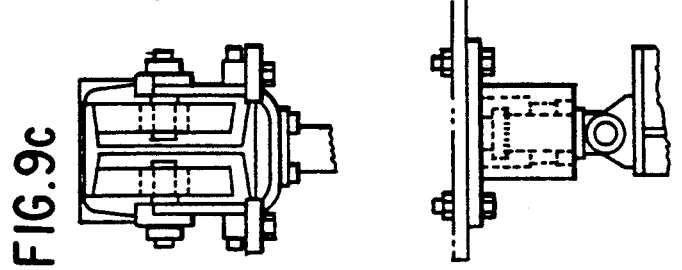
FIG. 9C is a cross-sectional view of a representative cable support.
FIG. 9D is a partial view of the connection between the festoon and the ceiling of the building.
Figures 9A, 9B:
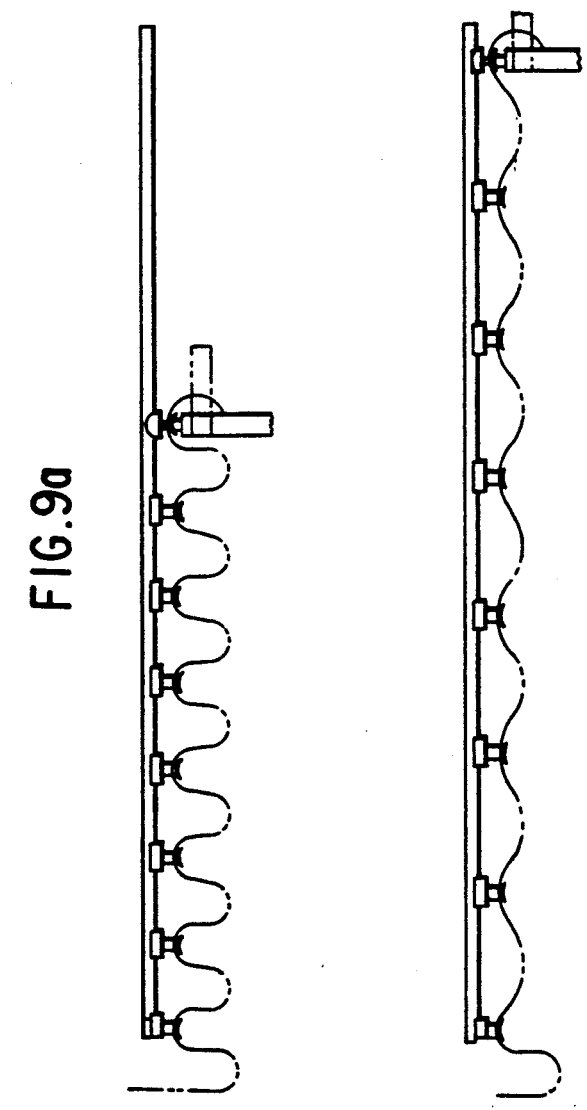
FIGS. 9A and 9B are side views of the festoon with loops of supply cable and flexible pipe contracted and expanded.

The height of platform assembly 700 can be precisely fixed by fine adjustment of ball screw 730. The extent to which robot platform 720 is extended from the cart toward the plane can be precisely fixed by fine adjustment of the motor driven rack and pinion 748 and the position sensing resolver 751, all in a manner to be described below. The robotic painter 600 is shown in FIG. 8 in phantom lines in its extended position 600'.

The cart carries robot controller 760 and cart controller 770 which minimizes the distance travelled by electronic commands to the robot painter and to the platform and wheel assemblies on the cart.

Safety barrier 780 is a plate fastened to the carrier in a position that prevents the robot platform from being extended into the fuselage or wing of the plane, thereby avoiding accidental damage to the aircraft. As is visible in FIG. 6, the robot platform and the robot arm can extend above barrier 780 in a raised position and below barrier 780 in a lowered position.

Figure 10:
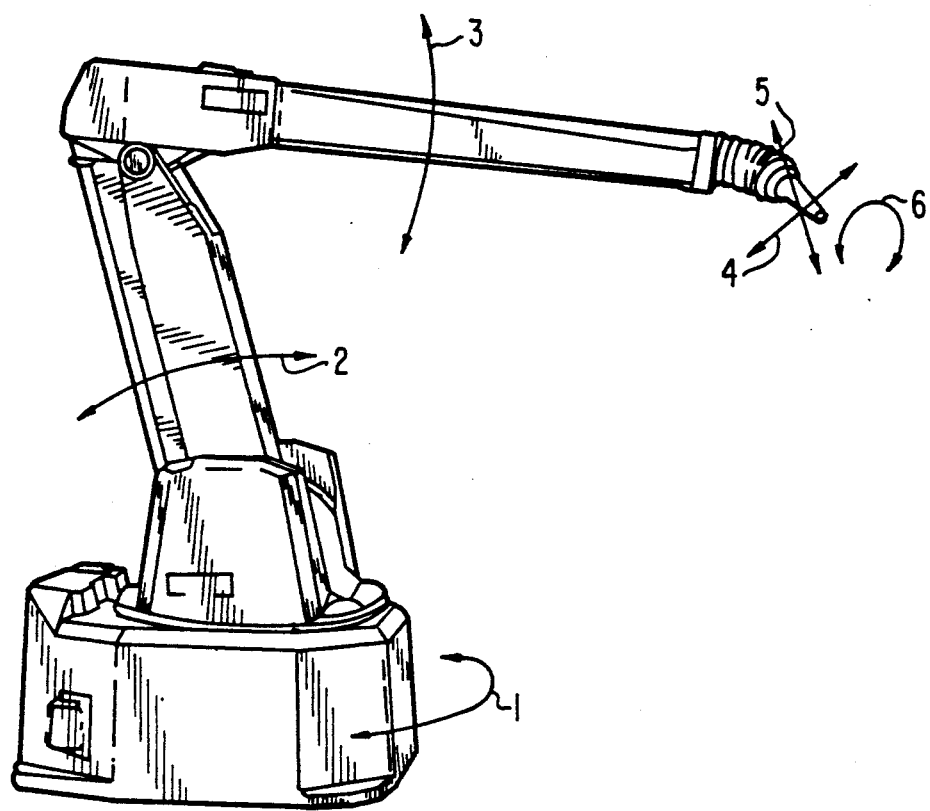
FIG. 10 is a perspective view of the robot painter showing the six axes of movement.
Figure 11:
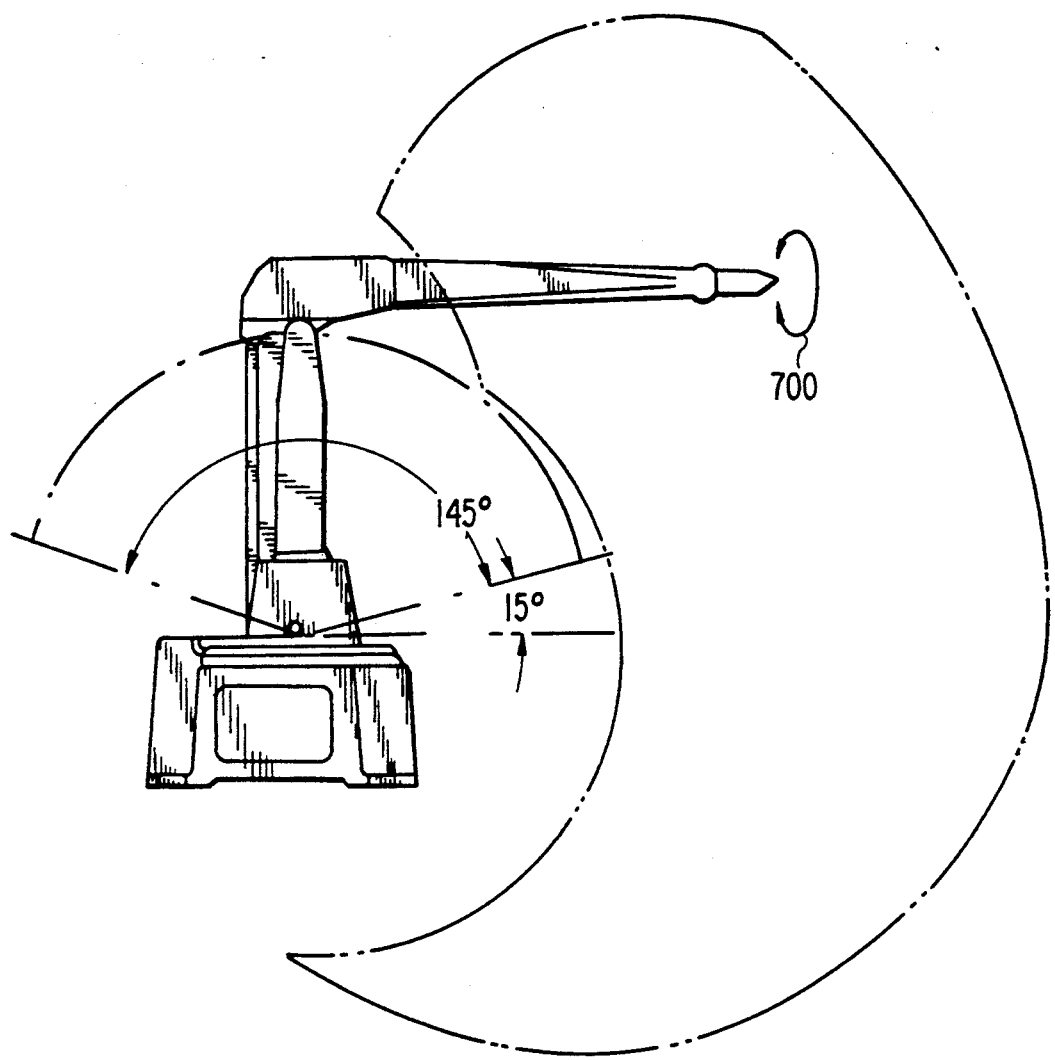
FIG. 11 is a schematic of the robot painter showing the extent of its reach.
Figure 12:
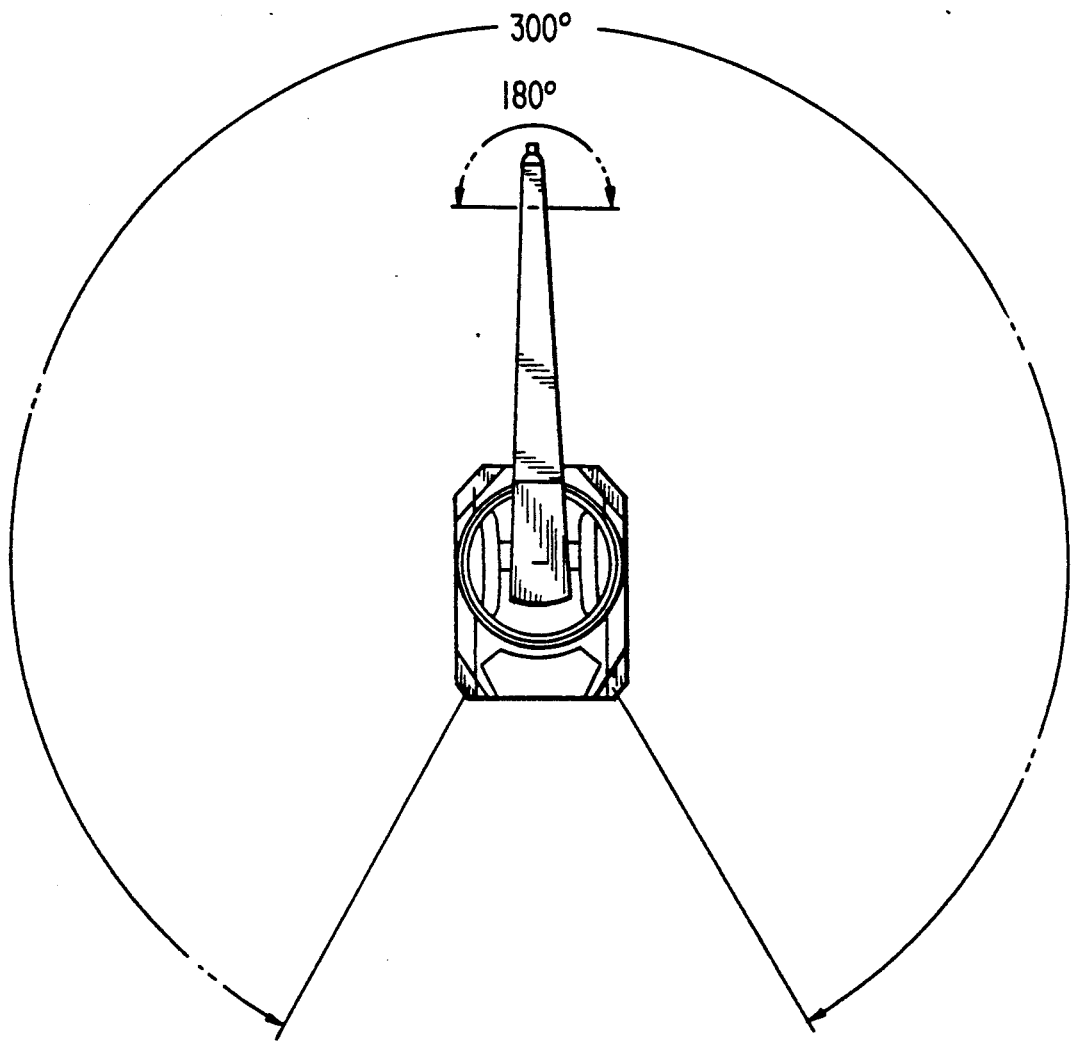
FIG. 12 is a schematic of the robot painter showing the extent of its side-to-side motion.
Figure 13:
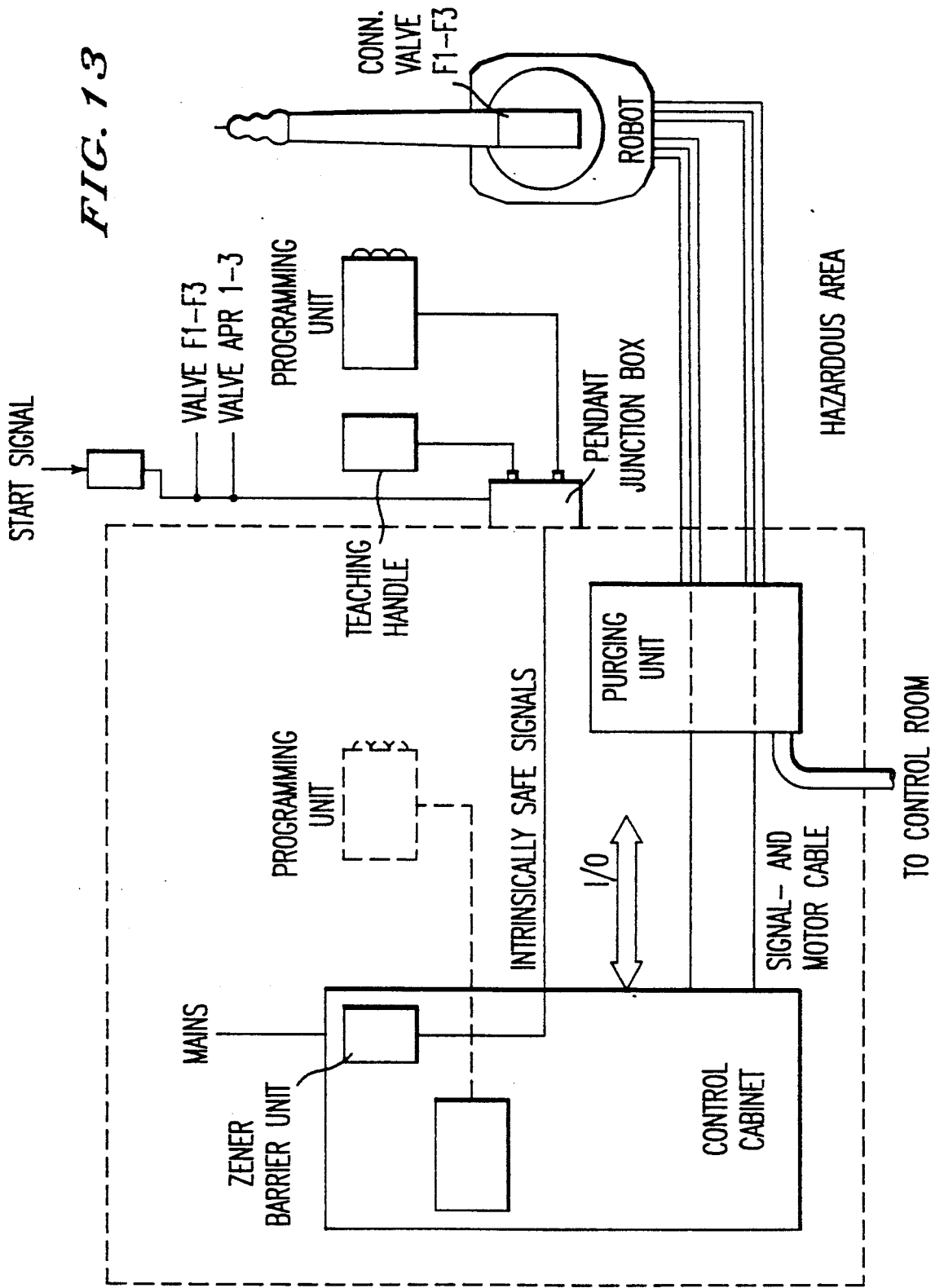
FIG. 13 is a schematic of the controller for the painting robot.

The drive axes, reach and range of motion of the conventional robot painter are illustrated in FIGS. 10, 11 and 12 and the control system for same is schematically illustrated in FIG. 13.

Figure 14B:
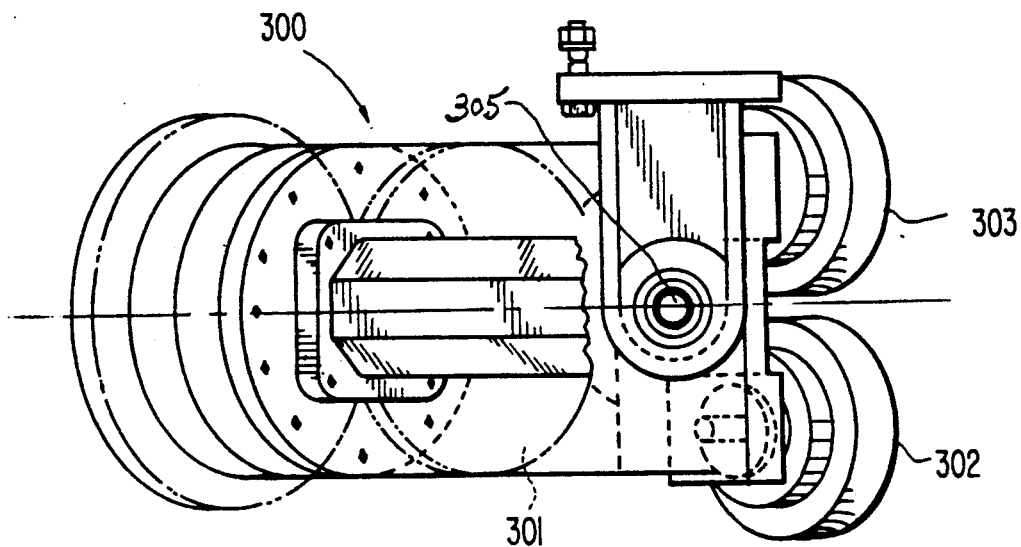
FIG. 14B is a top view of the entire drive wheel assembly showing three wheels.
Figure 14A:
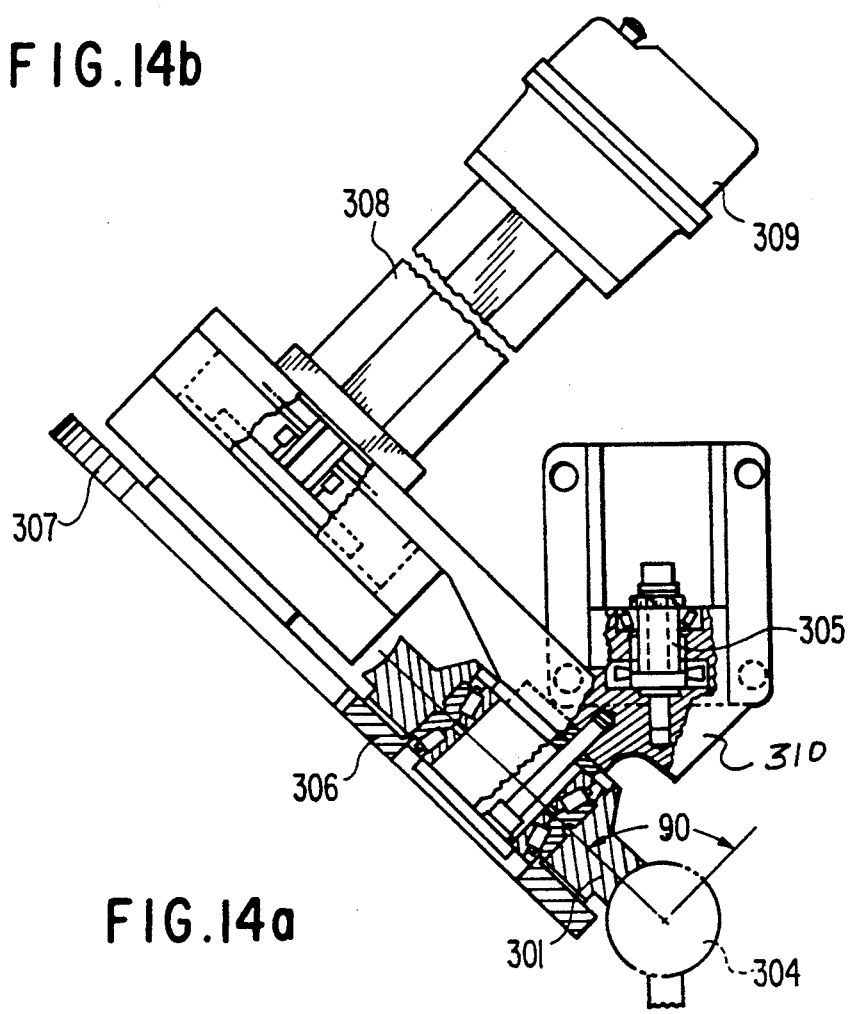
FIG. 14A is a partial cross-sectional side view of one side of the drive wheel assembly on the cart, showing one of three wheels.
Figure 14C:
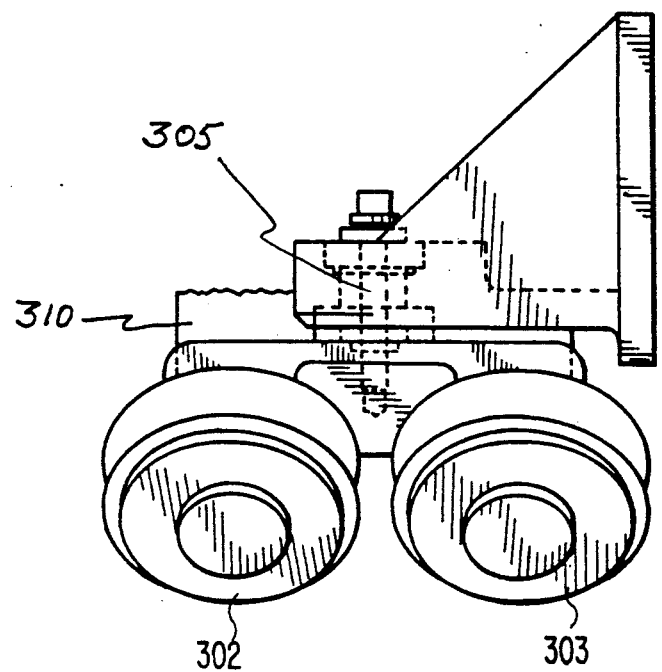
FIG. 14C is a side view of the other two wheels in the drive wheel assembly.
Figure 14D:
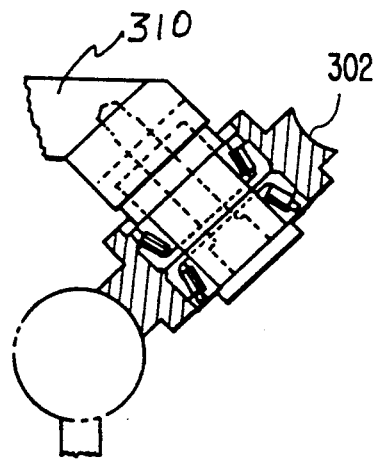
FIG. 14D is a cross-sectional side view of the wheels in FIG. 14C.

Drive wheel assembly 300 is illustrated in FIGS. 14A to 14D and includes a large weight bearing wheel 301 and two smaller weight bearing wheels 302 and each mounted to frame 310 in a fixed position relative to each other. These wheels have a concave rolling surface to mate with the circular cross section rail of track 1B. Wheel 301 is oriented 90 degrees to wheels 302 and 303 as shown in FIG. 14A and the wheel assembly is attached to the carrier frame for pivotal movement about pivot 305. Attached to wheel 301 is a drive which meshes with motor gear 307. Motor gear 307 is driven by the shaft of AC brushless motor 308 and braked by brake 309. Both motor and brake are explosion proof. Wheels 301, 302, and 303 are manganese bronze to prevent sparks. All electrical components on the cart are also explosion proof—a necessary feature for the painting cycle, but not needed during wash/rinse. Conventional tapered roller bearings are located in wheels 301, 302 and 303. The orientation of wheel assembly 300 is such that the motor 308/brake 309 assembly visible in FIG. 14A is on the outside of horseshoe track 1B. Due to the 90° orientation between wheel 301 and wheels 302, 303 the assembly cannot slip off rail 304 of track 1B.

Idler wheel assembly 400 is also carried on rail 304 of track 1B, i.e., it is on the same side of the carrier as drive wheel assembly 300. Idler wheel assembly 400 has components similar to—and correspondingly numbered—to drive wheel assembly 300.

Figure 18A:
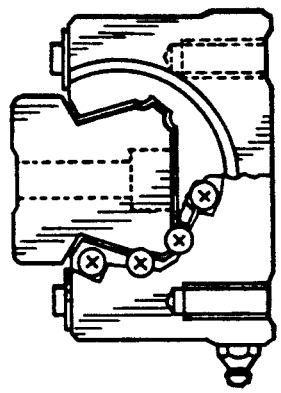
FIG. 18A is an end view of the bearing of FIG. 18.
Figure 18:
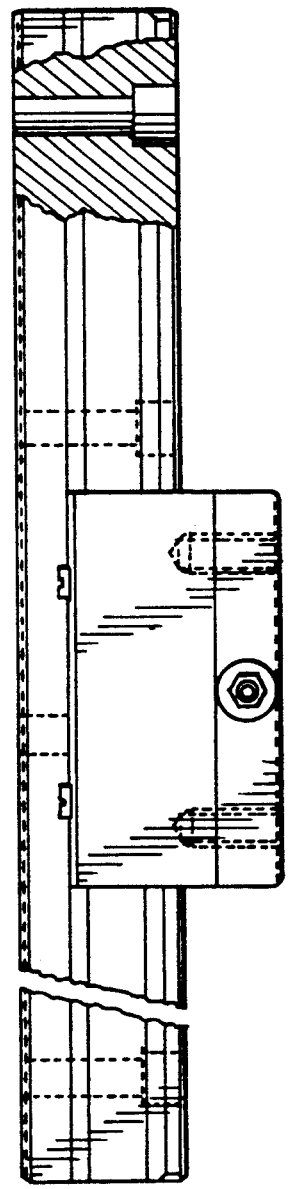
FIG. 18 is a side view of the linear motion bearing on the slip wheel assembly of FIGS. 17A-D.
Figure 19:
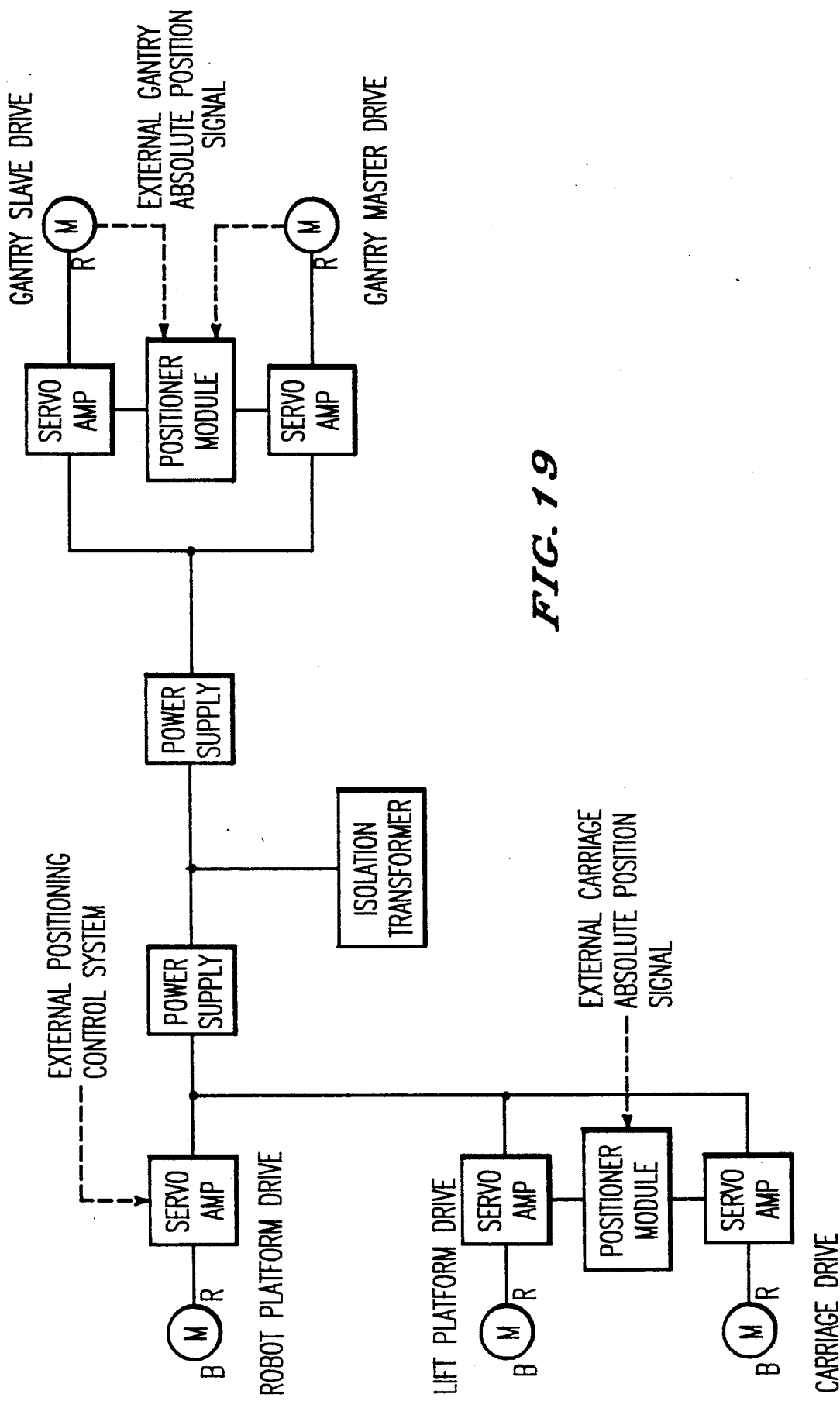
FIG. 19 is a block diagram of the cart/gantry drive system.
Figure 20:
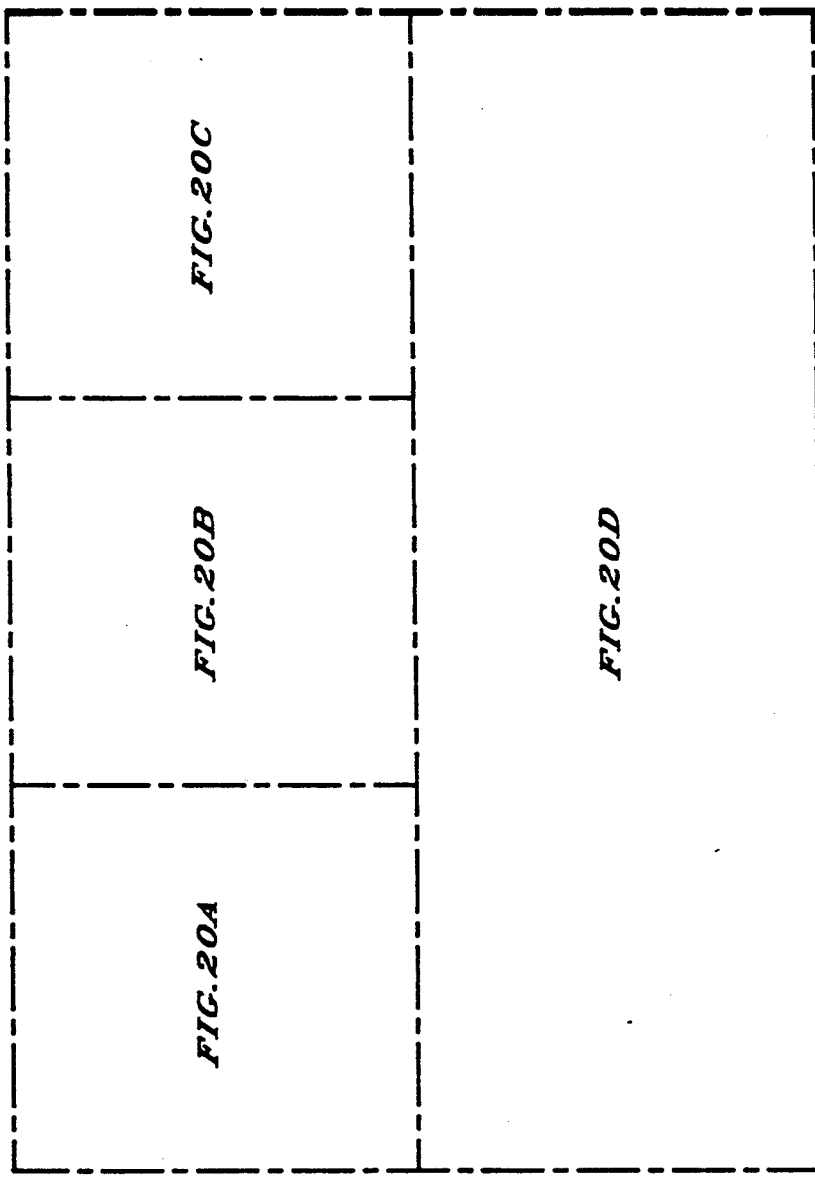
Figure 20B:
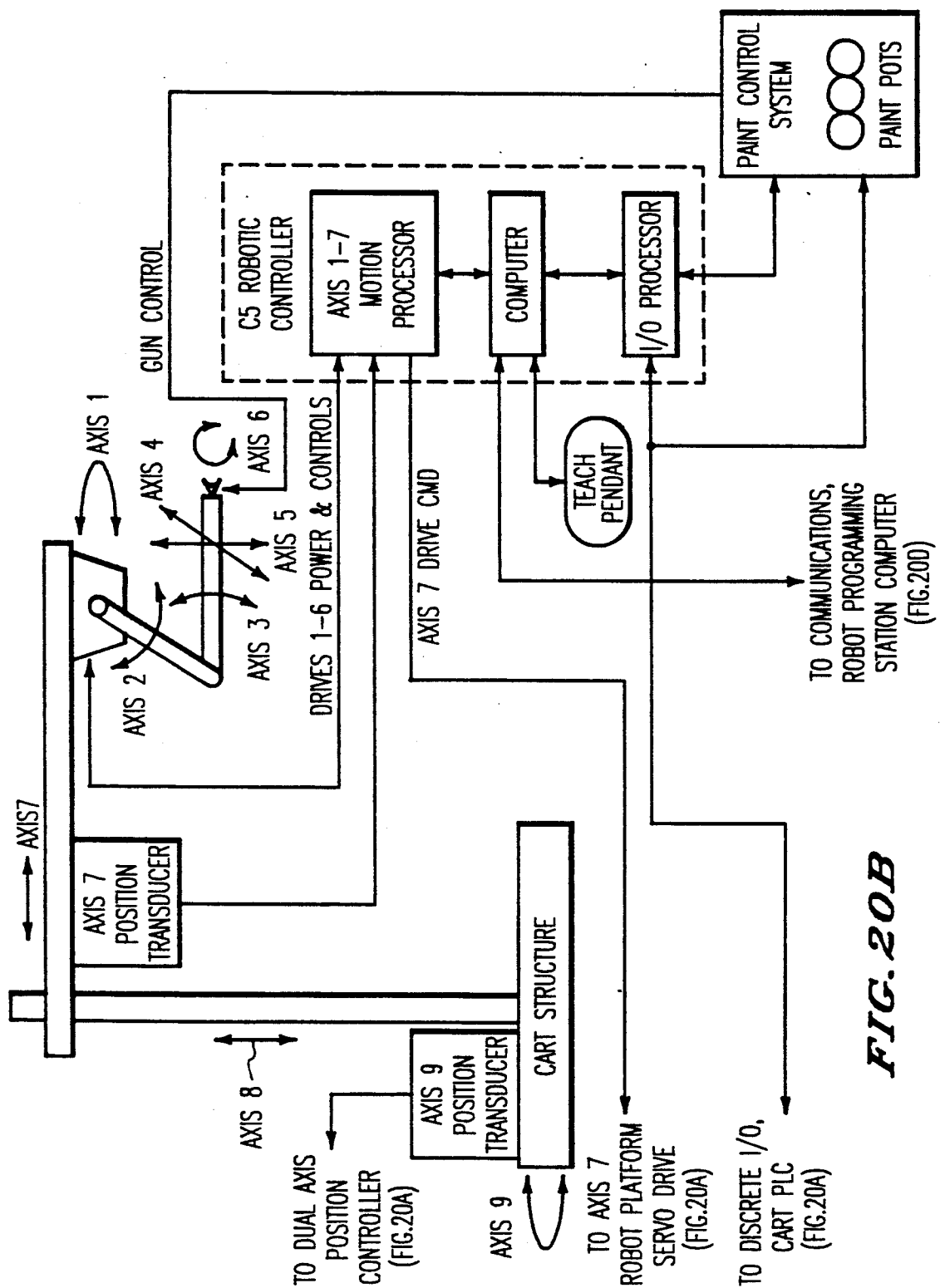
Figure 20C:
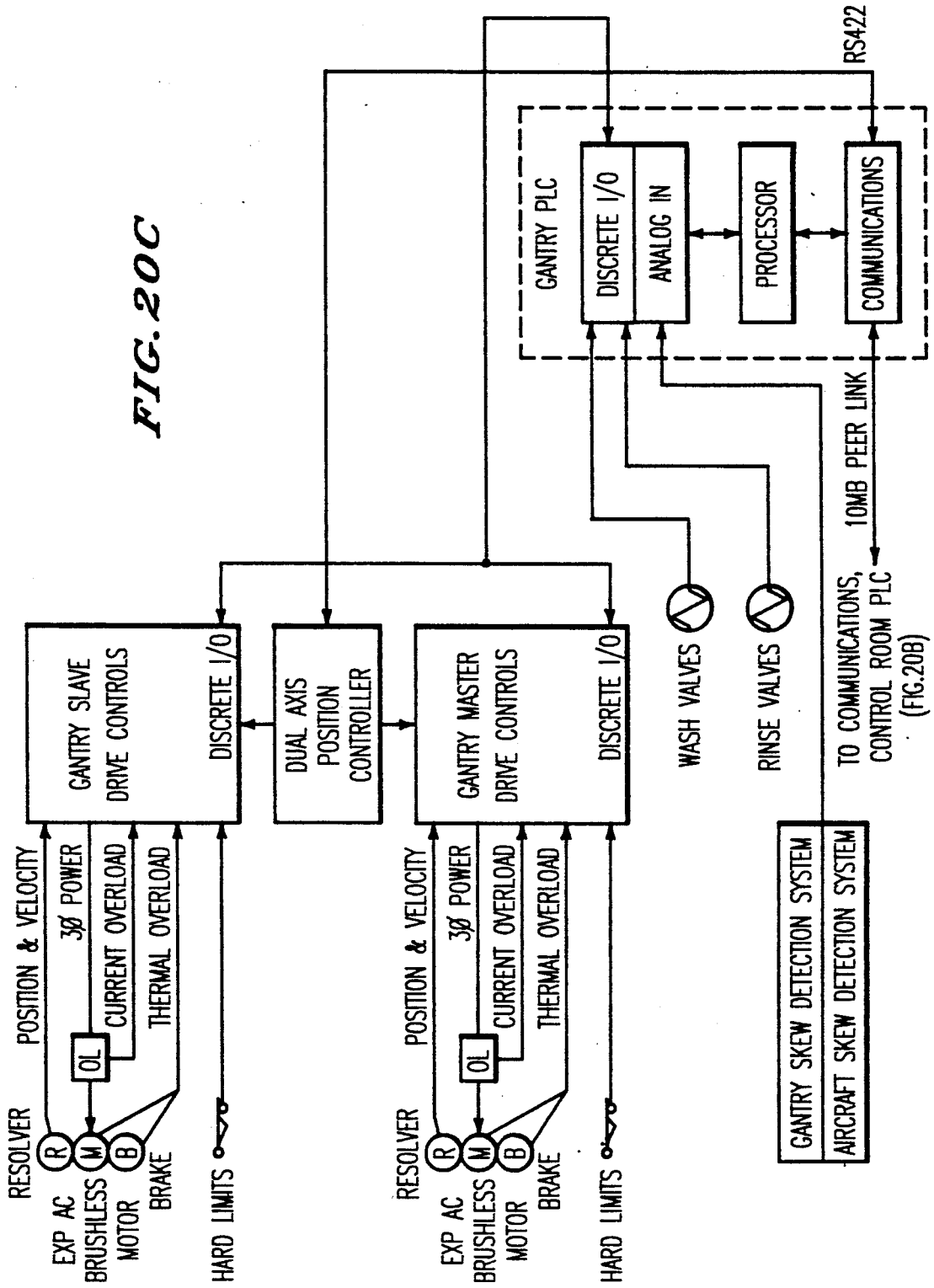
Figure 20D:
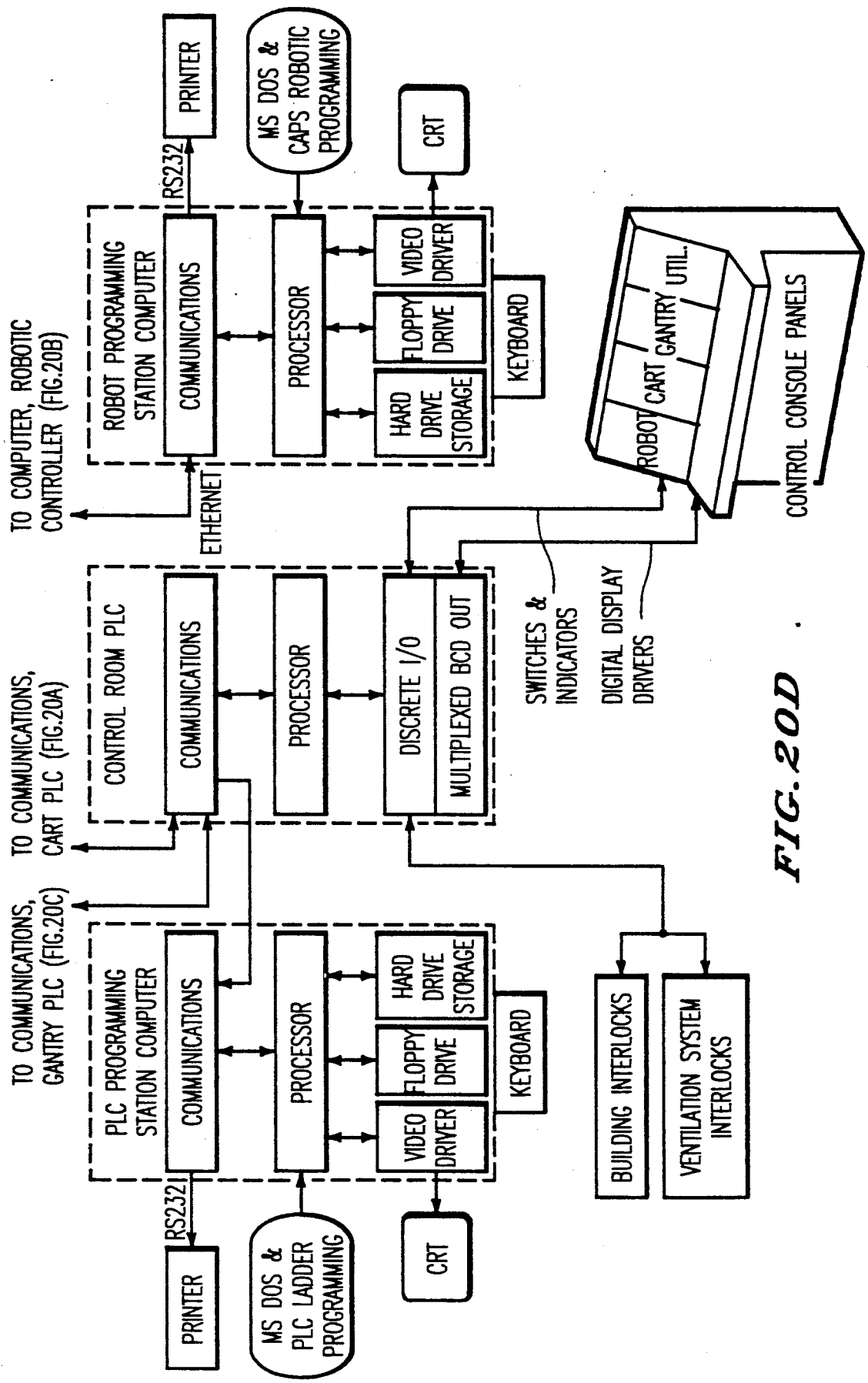

Slip wheel assembly 500 is carried on rail 304A of track 1A, i.e., the outermost track in the horseshoe, and is attached to the cart frame by means of linear motion bearings 506 (shown in FIG. 18) Which allow the Wheel assembly 500 to move relative to cart frame 102 to accommodate small variations in the distance between tracks 1A and 1B. Slip wheel assembly 500 is, similar to idler wheel assembly 400, a non-driven wheel assembly. Again, similar parts are similarly numbered in FIGS. 14, 16 and 17.

Figure 15A:
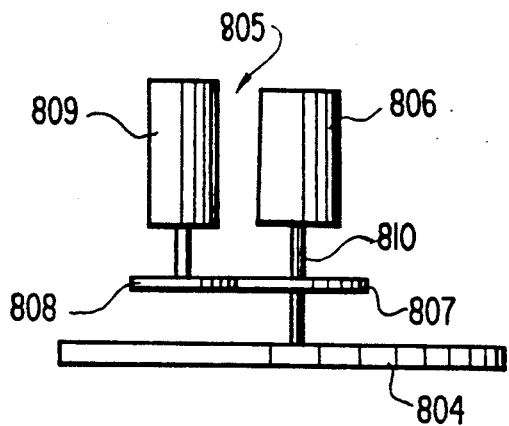
FIG. 15A is a schematic representation of the resolver of FIG. 15.
Figure 15:
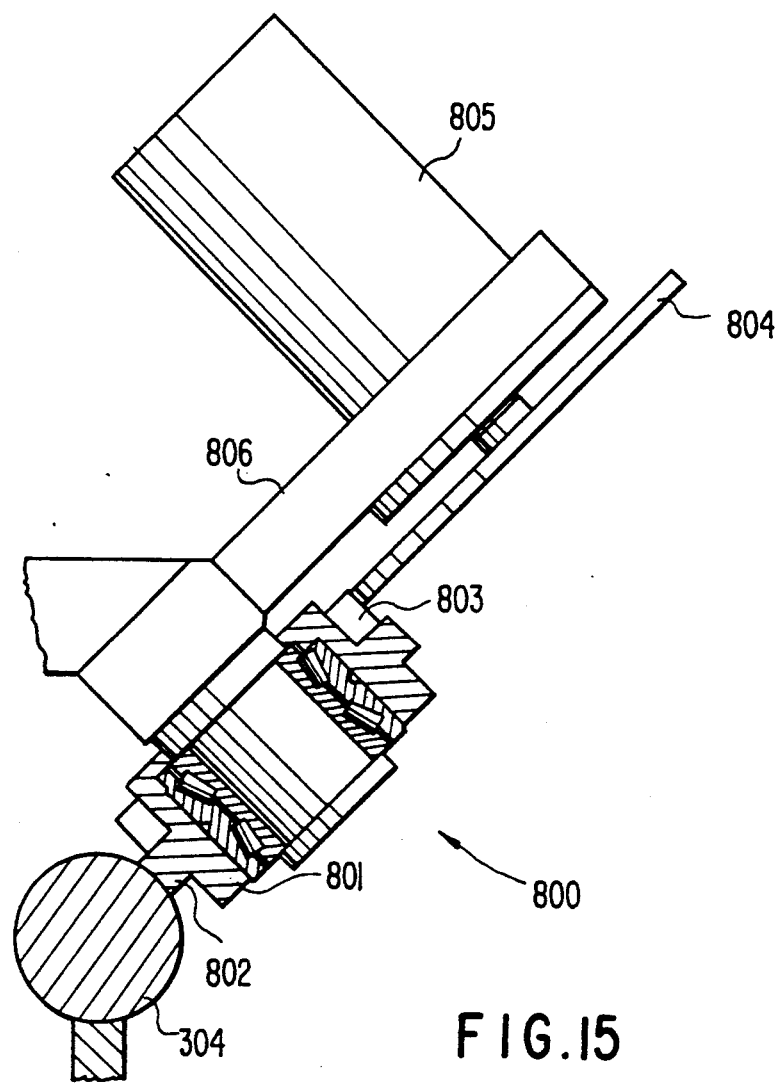
FIG. 15 is a partial cross-sectional side view of the cart position sensing wheel and the resolver housing.
Figure 16D:
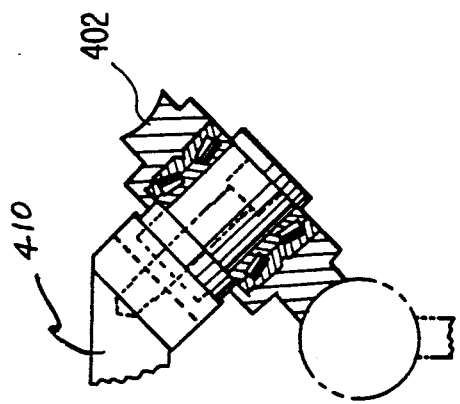
FIG. 16D is a cross-sectional side view of the wheels of FIG. 16C.
Figure 16A:
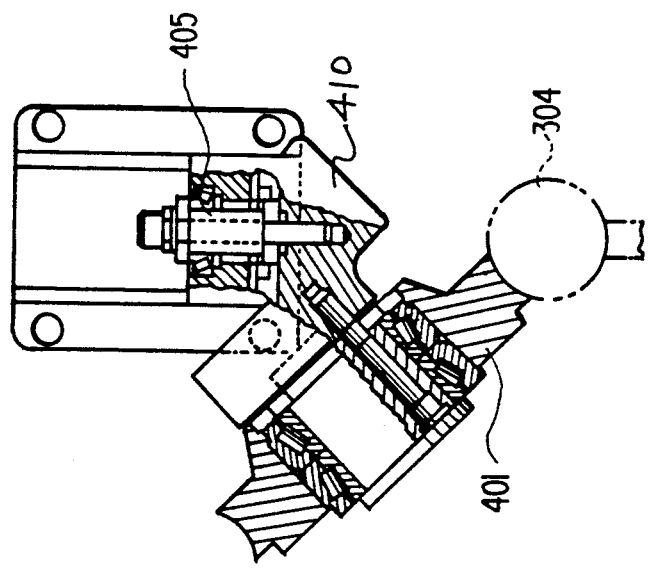
FIG. 16A is a cross-sectional side view of one side of the idler wheel assembly on the cart, showing one of three wheels.
Figure 16C:
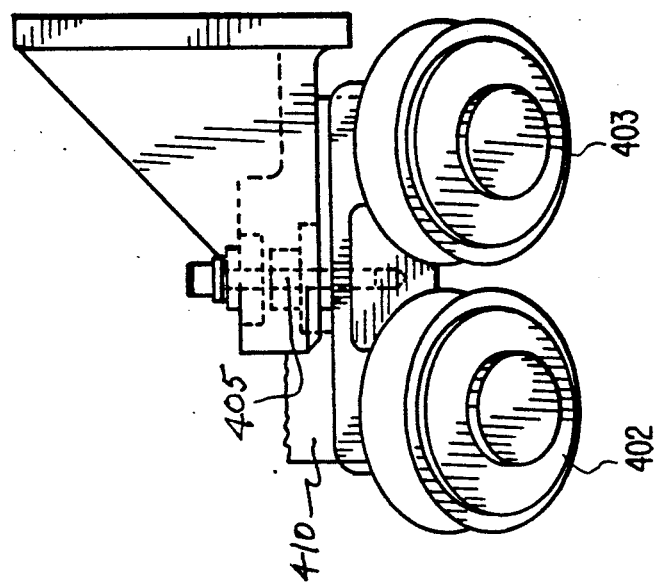
FIG. 16C is a side view of the other two wheels in the idler wheel assembly.
Figure 16B:
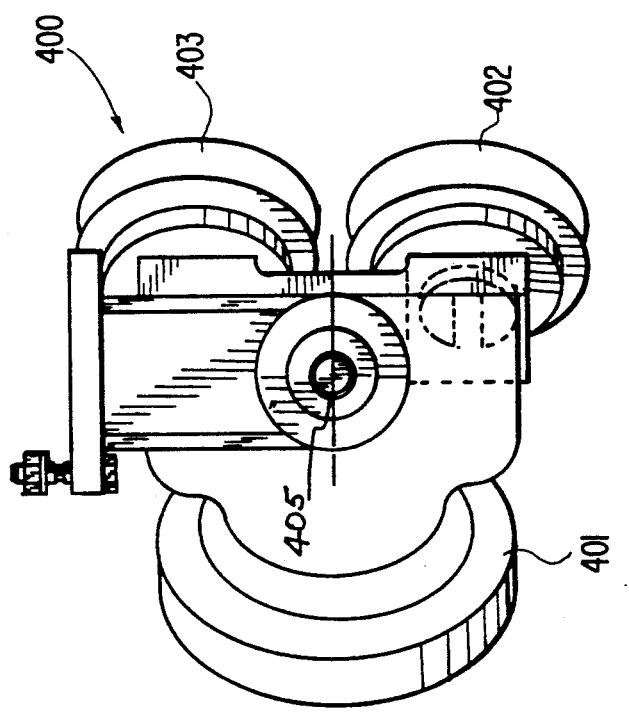
FIG. 16B is a top view of the entire idler wheel assembly showing three wheels.
Figure 17A:
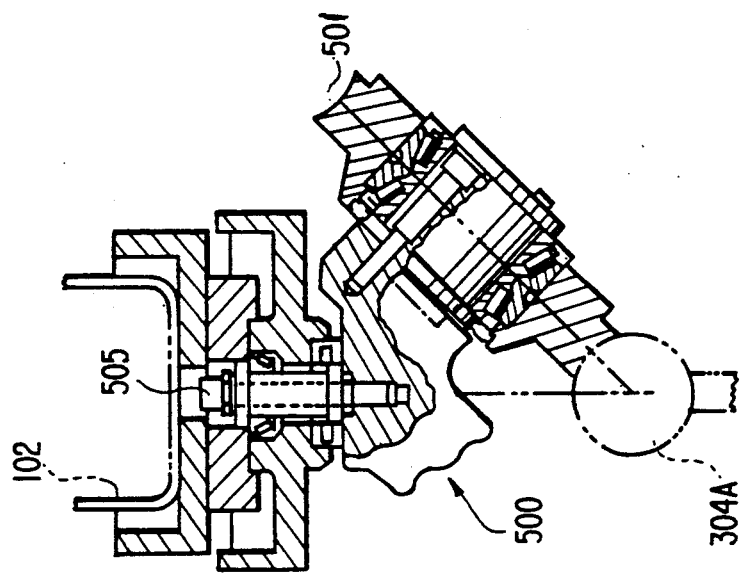
FIG. 17A is a cross-sectional side view of one side of the slip wheel assembly on the cart showing one of the wheels.
Figure 17B:
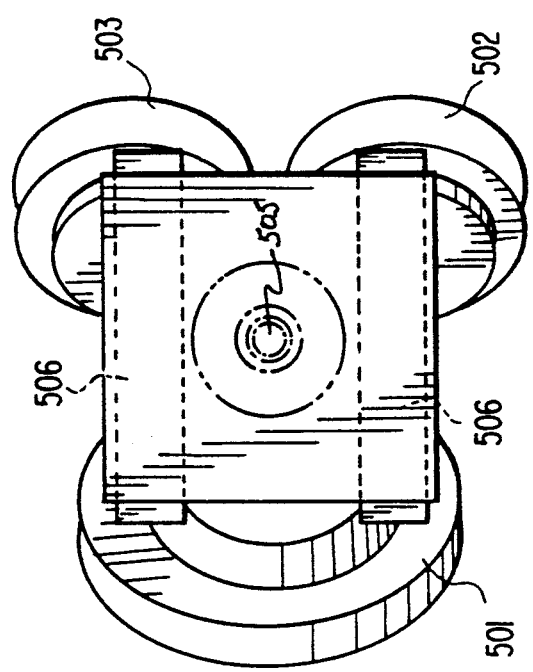
FIG. 17B is a top view of the entire slip wheel assembly showing three wheels.
Figure 17C:
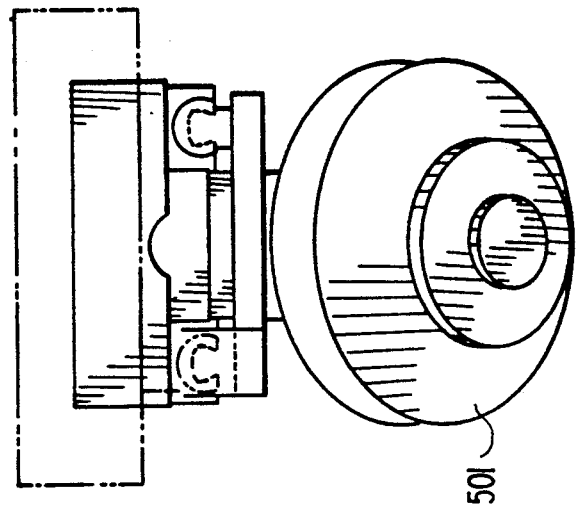
FIG. 17C is a side view of the wheel shown in FIG. 17A.
Figure 17D:
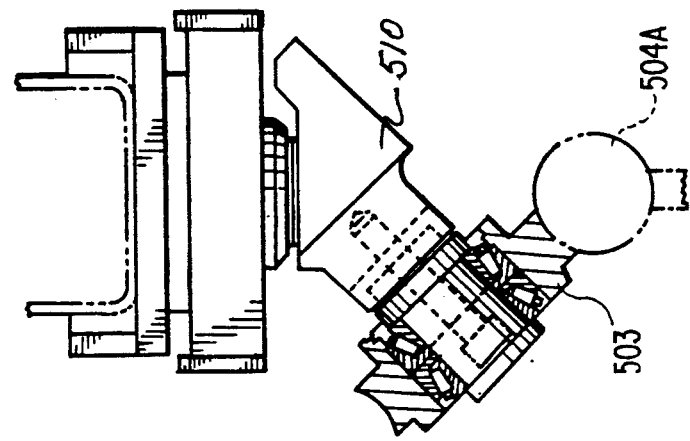
FIG. 17D is a cross-sectional side view of the other two wheels in FIG. 17B.

Position sensing wheel assembly 800 is shown in FIG. 15. Wheel 801 rides on rail 304 and has the same angular orientation as wheels 302, 303 so that it tracks on a part of the track kept clean by the passage of wheels 302, 303 and 402, 403. Wheel 801 preferably has a small nose portion 802 which actually tracks on rail 304. Wheel gear 803 is co-axial with wheel 801, and meshes with resolver gear 804. Resolver housing 805, carried on wheel assembly frame 806, contains two conventional resolvers—one for coarse adjustment and one for fine adjustment. Resolver gear 804 drives the shaft 805 of fine resolver 806. Gear 807 on this shaft drives gear 808 on coarse resolver 809 (FIG. 15A).

Position sensing wheel assembly 800 provides a feedback signal to the controller which permits very precise positioning of the cart on the horseshoe track. The horseshoe track is, for example, approximately 160 feet long for use with an F-15 aircraft. The resolver can determine the degree, minute and second of angular orientation. 360° × 60 min. × 60 sec. = 1,296,000 angular bits or parts. A track length of 160 feet equals 1,920 inches which, when divided by 1,296,000 equals 0.0015 inches per bit. In other words, the resolver can replicate an accuracy of 0.0015 inches at any point along the 160 feet of horseshoe track.

A resolver can keep very close account of where it is within one revolution, but it doesn't know how many full revolutions it has made, and thus cannot generate a feedback signal representative of more than one revolution. Two resolvers cooperating as shown in FIG. 15A can feedback signals making it possible to count more than one revolution. For example, the size of Wheel 801, gear 803 and gear 804 is chosen so that gear 804 rotates almost 64 times when the cart travels the full 160 feet of the track. Fine resolver 806 also rotates almost 64 times over the full length of the track, but at any given location it doesn't know how many of the 64 full turns it has made. The coarse resolver provides this information. Gear 807 may have, for example, 300 teeth and gear 808 may have 320 teeth. One rotation of the fine resolver gear 807 rotates the coarse gear 0.9375 revolutions (300/320). Thus, when the coarse resolver reads 0.9375, the fine resolver has rotated one time. A second rotation of gear 807 rotates the coarse resolver a total of 1.875 revolutions (600/320) but the one is not discernable to the coarse resolver—it simply reads 0.875. A third rotation of gear 807 rotates the coarse resolver a total of 2.8125 (900/320) rotations, which only reads 0.8125. Thus, the coarse resolver can give read-outs corresponding to full revolutions of gear 804 and the fine resolver can give read-outs corresponding to a point in a partial revolution of gear 804. Taken together, any point along the 160 feet of track can be replicated to within 0.0015 inches.

The rack and pinion controlling the robot platform works in a similar fashion, although one resolver can be used due to the much shorter distance moved by the platform. The resolver has a conventional split gear that travels in the rack—it is split so that one side of the teeth tightly contact one side of the rack teeth and the other side of the gear teeth tightly contact the other side of the rack teeth. The resolver can determine the precise position of the robot platform relative to the lift platform and feedback a signal to the controller which enables it to control the precise position of the robot platform.

FIGS. 19, 20, and 20*a*-20*d* are self-explanatory block diagrams of the controller systems.

Obviously, numerous modifications and variations of the present invention are possible in light of the above teachings. It is therefore to be understood that within the scope of the appended claims, the invention may be practiced otherwise than as specifically described herein.

We claim:

1. An apparatus for performing robotically controlled maintenance on an object wherein control over the position and orientation of a maintenance robot with respect to the object is necessary to replicate such maintenance, the apparatus comprising:
    a maintenance robot;
    a mobile cart for supporting said robot;
    a track, said track including a curved portion;
    a plurality of wheel assemblies for carrying said cart on said track;
    each of said wheel assemblies being in contact with said track, each wheel assembly including three wheels and means for mounting said three wheels in a fixed position relative to each other and means for pivoting said three wheels relative to said cart for travel along said curbed portion of said track.

2. An apparatus as in claim 1 wherein a first wheel of each said wheel assembly is mounted at a substantially 90 degree orientation to a second and third wheel of each said wheel assembly.

3. An apparatus as in claim 2 wherein said second and third wheels are mounted for rotation in substantially the same plane.

4. An apparatus as in claim 1 wherein each of said three wheels is mounted between said cart and said track and wherein each of said three wheels bears the weight of said cart on said track.

5. An apparatus as in claim 1 wherein said track is substantially circular in cross-section with a substantially circular peripheral surface and said three wheels each include a concave surface mating with said track circular peripheral surface.

6. An apparatus as in claim 1 wherein a first wheel of each wheel assembly has an axis of rotation in a first plane and a second wheel of each wheel assembly has an axis of rotation in a second plane and a third wheel of each wheel assembly has an axis of rotation in a third plane, and wherein said first and second planes are parallel and said third plane is parallel to and lies between said first and second planes.

7. An apparatus as in claim 6 wherein said third plane lies midway between said first and second planes.

8. AN apparatus as in claim 1 including a first track and a second track and first and second wheel assemblies for carrying said cart on said first track and a third wheel assembly for carrying said cart on said second track.

9. An apparatus as in claim 1 including a lift platform for supporting said robot and means for movably mounting said lift platform on said cart for vertical movement relative to said track; and
    at least one fluid containing tank supported on said lift platform and means for connecting said tank to said robot, whereby the distance between said tank and said robot is minimized.

10. An apparatus as in claim 1 including a lift platform for supporting said robot and means for movably mounting said lift platform on said cart for vertical movement relative to said track;
    a robot platform for supporting said robot and means for extending said robot platform along and beyond the end of said lift platform for horizontal extension of said robot beyond the end of said lift platform.

11. An apparatus as in claim 1 including a floor for supporting said track said track being continuous;
    means for rigidly attaching said track to said floor at at least one predetermined location;
    means for slideably attaching said track to said floor at a plurality of locations to compensate for thermal expansion of said track.

12. An apparatus for performing robotically controlled maintenance on an object wherein control over the position and orientation of a maintenance robot with respect to the object is necessary to replicate such maintenance, the apparatus comprising:
    a maintenance robot;
    a mobile cart for supporting said robot;
    a track positioned on a floor for supporting said cart;
    a plurality of wheel assemblies in contact with said track for carrying said cart on said track;
    a lift platform for supporting said robot and means for movably mounting said lift platform on said cart for vertical movement relative to said track; and
    at least one fluid containing tank supported on said lift platform and means for connecting said tank to said robot, whereby the distance between said tank and said robot is minimized.

13. An apparatus as in claim 12 including a robot platform for supporting said robot and means for extending said robot platform beyond the end of said lift platform for horizontal extension of said robot beyond the end of said lift platform.

14. An apparatus as in claim 12 wherein said means for movably mounting said lift platform includes a ball screw assembly.

15. An apparatus as in claim 12 wherein said track includes a curved portion and wherein each of said wheel assemblies includes three wheels and further including means for mounting said three wheels in a fixed position relative to each other and means for pivoting said three wheels relative to said cart for travel along said curbed portion of said track.

16. An apparatus as in claim 12 including a floor for supporting said track;
    means for rigidly attaching said track to said floor at at least one predetermined location;
    means for slideably attaching said track to said floor at a plurality of locations to compensate for thermal expansion of said track.

17. An apparatus for performing robotically controlled maintenance on an object wherein control over the position and orientation of a maintenance robot with respect to the object is necessary to replace such maintenance, the apparatus comprising:
   a maintenance robot;
   a mobile cart for supporting said robot;
   a track positioned on a floor for supporting said track; said track being continuous;
   a plurality of wheel assemblies for carrying said cart on said track;
   means for rigidly attaching said track to said floor at at least one predetermined location;
   mean for slideably attaching said track to said floor at a plurality of locations to compensate for thermal expansion of said track.

18. An apparatus as in claim 17 wherien said track includes a curved portion and wherein each of said wheel assemblies includes three wheels and further including means for mounting said three wheels in a fixed position relative to each other and means for pivoting said three wheels relative to said cart for travel along said curved portion of said track.

19. An apparatus as in claim 17 including a lift platform for supporting said robot and means for movably mounting said lift platform on said cart for vertical movement relative to said track; and
   at least one fluid containing tank supported on said lift platform and means for connecting said tank to said robot, whereby the distance between said tank and said robot is minimized.

20. An apparatus as in claim 17 including:
   a lift platform for supporting said robot and means for movably mounting said lift platform on said cart for vertical movement relative to said track; and
   a robot platform for supporting said robot and means for extending said robot platform along and beyond the end of said lift platform for horizontal extension of said robot beyond the end of said lift platform.

21. An apparatus for performing robotically controlled maintenance on an object wherein control over the position and orientation of a maintenance robot with respect to the object is necessary to replicate such maintenance, the apparatus comprising:
   a maintenance robot;
   a mobile cart for supporting said robot;
   a track positioned on a floor for supporting said track;
   a plurality of wheel assemblies in contact with said track for carrying said cart on said track;
   a lift platform for supporting said robot and means for movably mounting said lift platform on said cart for vertical movement relative to said track; and
   a robot platform for supporting said robot and means for extending said robot platform along and beyond the end of said lift platform for horizontal extension of said robot beyond the end of said lift platform.

22. An apparatus as in claim 21 further including:
   means for rigidly attaching said track to said floor at at least one predetermined location; and
   means for slideably attaching said track to said floor at a plurality to flotations to compensate for thermal expansion of said track.

23. An apparatus as in claim 21 wherein said track includes a curved portion and wherein each of said wheel assemblies includes three wheels and further including means for mounting said three wheels in a fixed position relative to each other and means for pivoting said three wheels relative to said cart for travel along said curbed portion of said track.

24. An apparatus as in claim 21 further including at least one fluid containing tank supported on said lift platform and means for connecting said tank to said robot, whereby the distance between said tank and said robot is minimized.

25. The apparatus of claim 21 including,
   said track having a curved portion.

26. The apparatus of claim 21 including,
   means for rigidly attaching said track to said floor at at least one predetermined location; and
   means for slideably attaching said track to said floor at a plurality of locations to compensate for thermal expansion of said track.

27. The apparatus of claim 21 including,
   means for rigidly attaching said track to said floor at at least one predetermined location;
   means for slideably attaching said track to said floor at a plurality of locations to compensate for thermal expansion of said track,
   said track includes a curved portion and wherien each of said wheel assemblies includes three wheels and further including means for mounting said three wheels in a fixed position relative to each other and means for pivoting said three wheels relative to said cart for travel along said curbed portion of said track, and
   at least one fluid containing tank supported on said lift platform and means for connecting said tank to said robot, whereby the distance between said tank and said robot is minimized.

* * * * *